(12) United States Patent
Shafir Nir

(10) Patent No.: US 11,581,018 B2
(45) Date of Patent: Feb. 14, 2023

(54) SYSTEMS AND METHODS FOR MIXING DIFFERENT VIDEOS

(71) Applicant: FUSIT, INC., Santa Monica, CA (US)

(72) Inventor: Michal Shafir Nir, Tel Aviv (IL)

(73) Assignee: FUSIT, INC., Santa Monica, CA (US)

( * ) Notice: Subject to any disclaimer, the term of this patent is extended or adjusted under 35 U.S.C. 154(b) by 0 days.

(21) Appl. No.: 17/466,473

(22) Filed: Sep. 3, 2021

(65) Prior Publication Data
US 2022/0068313 A1 Mar. 3, 2022

Related U.S. Application Data

(60) Provisional application No. 63/074,148, filed on Sep. 3, 2020.

(51) Int. Cl.
| | |
|---|---|
| *G11B 27/031* | (2006.01) |
| *H04N 19/40* | (2014.01) |
| *G06T 7/194* | (2017.01) |
| *G06T 3/60* | (2006.01) |

(Continued)

(52) U.S. Cl.
CPC ............ *G11B 27/031* (2013.01); *G06T 3/60* (2013.01); *G06T 7/194* (2017.01); *G06V 20/41* (2022.01); *G06V 20/48* (2022.01); *G06V 20/49* (2022.01); *G06V 40/161* (2022.01); *H04N 19/40* (2014.11); *G06T 2207/10016* (2013.01); *G06T 2207/20084* (2013.01); *G06T 2207/20132* (2013.01)

(58) Field of Classification Search
CPC ...... G11B 27/031; H04N 19/40; G06T 7/194; G06T 3/60; G06T 2207/10016; G06T 2207/20084; G06T 2207/20132; G06V 20/49; G06V 40/161; G06V 20/41; G06V 20/48

See application file for complete search history.

(56) References Cited

U.S. PATENT DOCUMENTS

| | | |
|---|---|---|
| 8,782,176 B2 | 7/2014 | Zohar et al. |
| 10,734,027 B2 | 8/2020 | Nir et al. |
| 10,811,052 B2 | 10/2020 | Shafir Nir et al. |

(Continued)

*Primary Examiner* — Sunghyoun Park
(74) *Attorney, Agent, or Firm* — Browdy and Neimark, PLLC

(57) ABSTRACT

There are provided methods and systems for media processing, comprising: providing at least one media asset source selected from a media asset sources library, the at least one media asset source comprising at least one source video, via a network to a client device; receiving via the network or the client device a media recording comprising a client video recorded by a user of the client device; transcoding the at least one source video and the client video which includes parsing the client video and the source video, respectively, to a plurality of client video frames and a plurality of source video frames based on the matching; segmenting one or more frames of the plurality of source video frames to one or more character frames; detecting one or more face images in one or more frames of the plurality of client video frames and provide face markers; resizing the one or more character frames according to the face markers compositing the resized character frames with the background frames using one or more blending methods to yield a mixed media asset frames; and encoding the mixed media asset frames to yield a mixed media asset video.

18 Claims, 18 Drawing Sheets

(51) Int. Cl.
*G06V 20/40* (2022.01)
*G06V 40/16* (2022.01)

(56) References Cited

U.S. PATENT DOCUMENTS

| | | | |
|---|---|---|---|
| 2014/0169768 A1* | 6/2014 | Webb | H04N 21/854 |
| | | | 386/285 |
| 2016/0173960 A1* | 6/2016 | Snibbe | H04N 21/2353 |
| | | | 386/285 |
| 2018/0192064 A1* | 7/2018 | Kim | H04N 19/172 |
| 2019/0096438 A1* | 3/2019 | Shafir Nir | G11B 27/34 |
| 2020/0007956 A1* | 1/2020 | Mathur | H04N 21/854 |

* cited by examiner

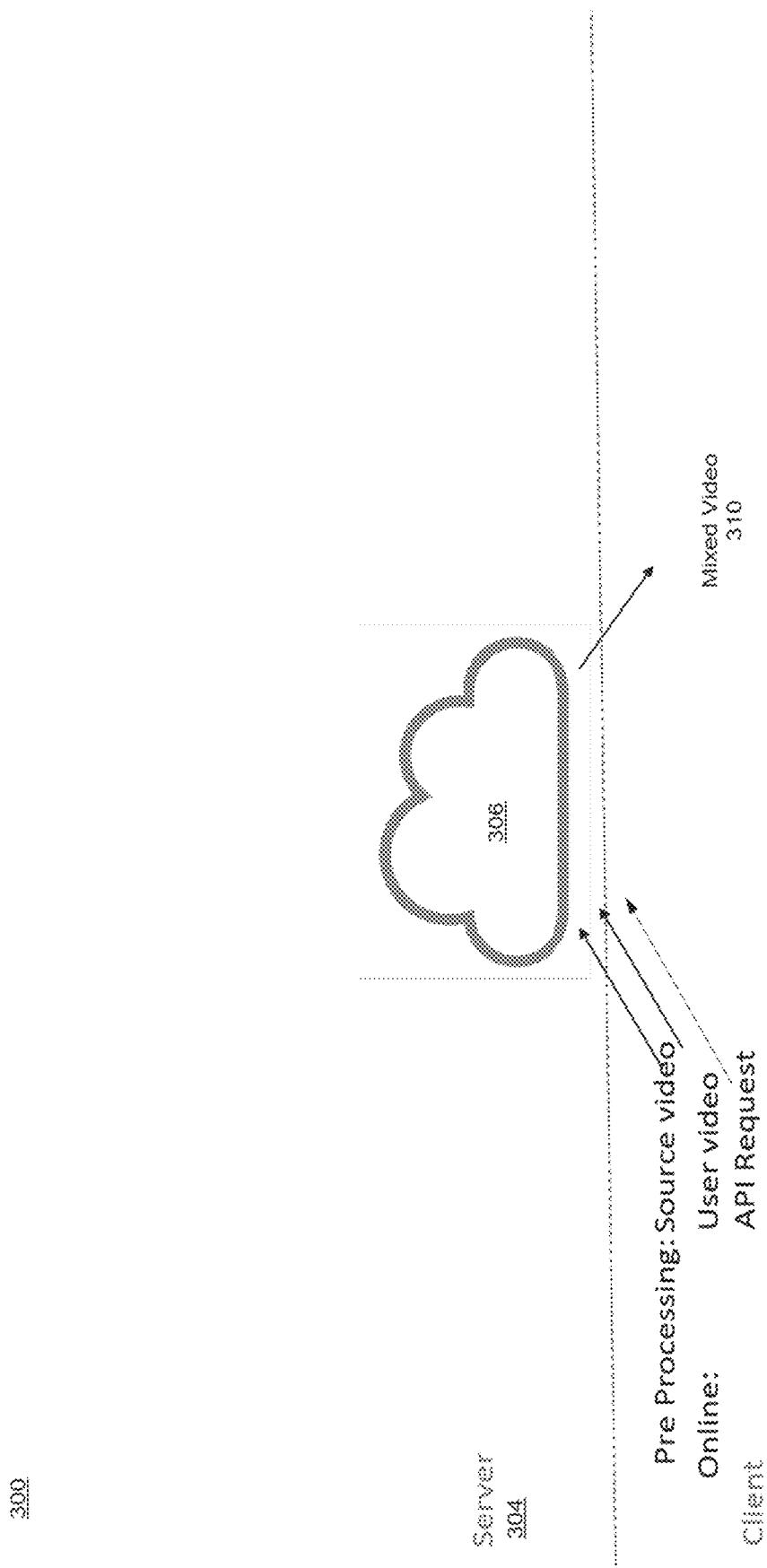

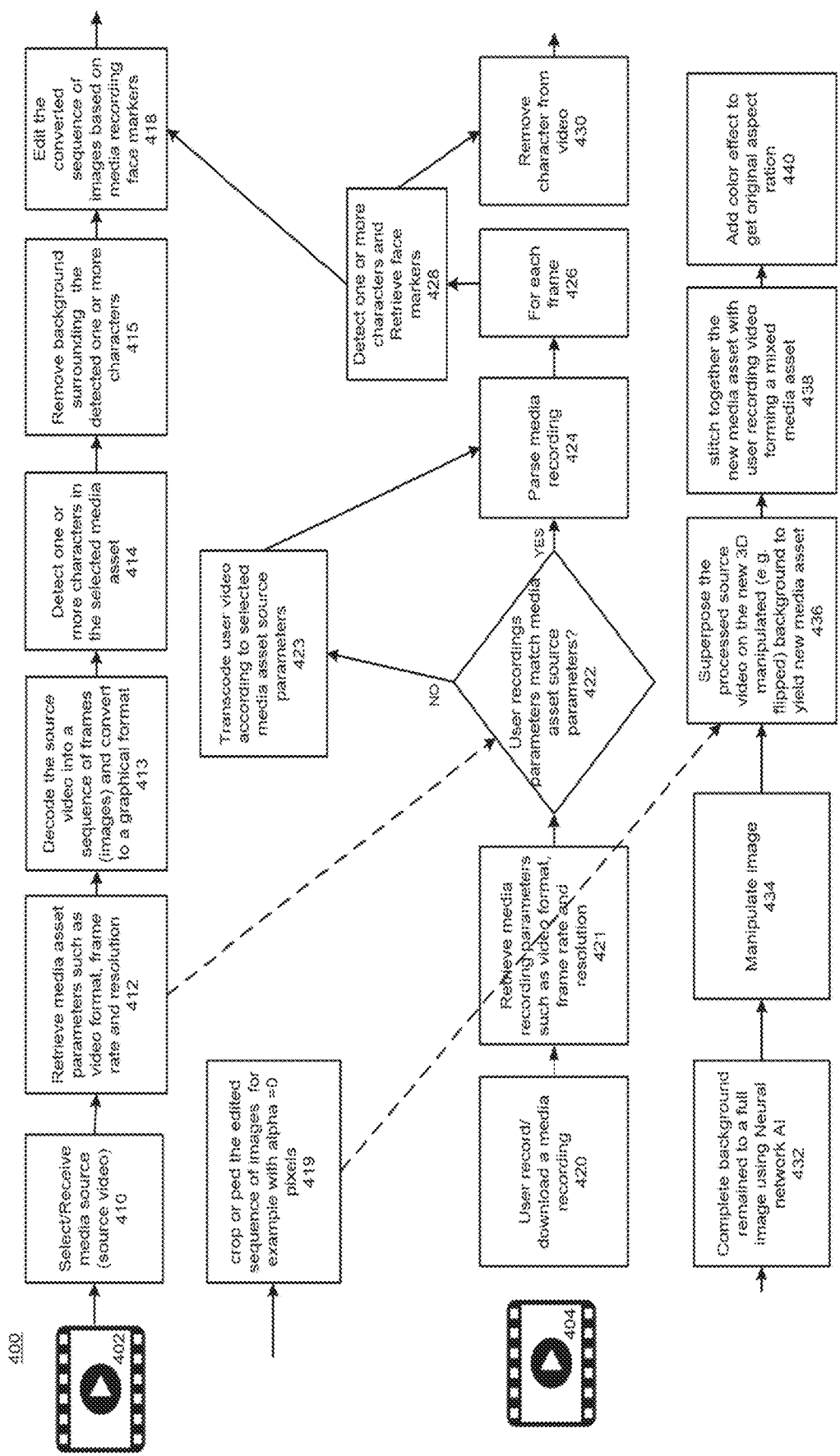

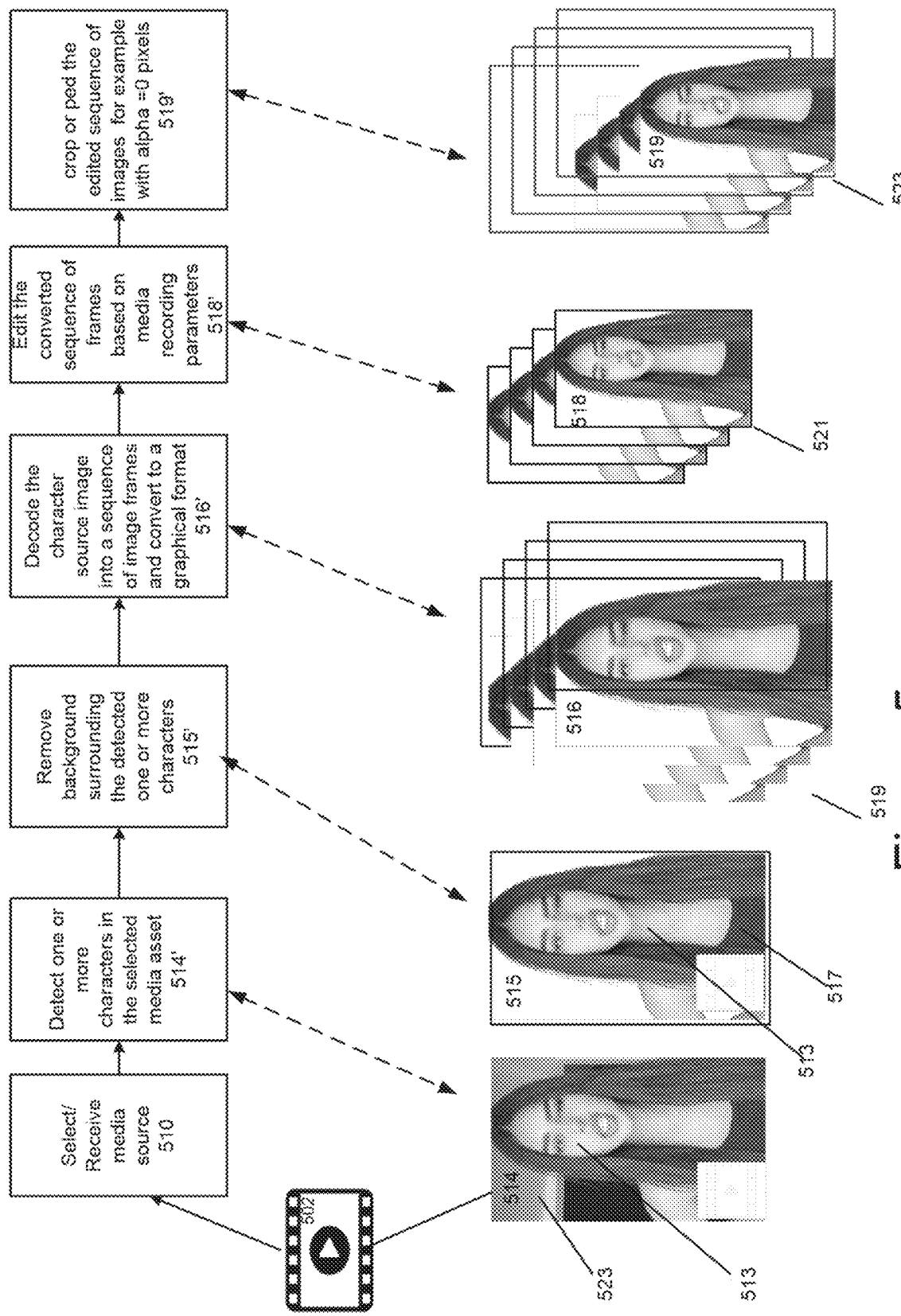

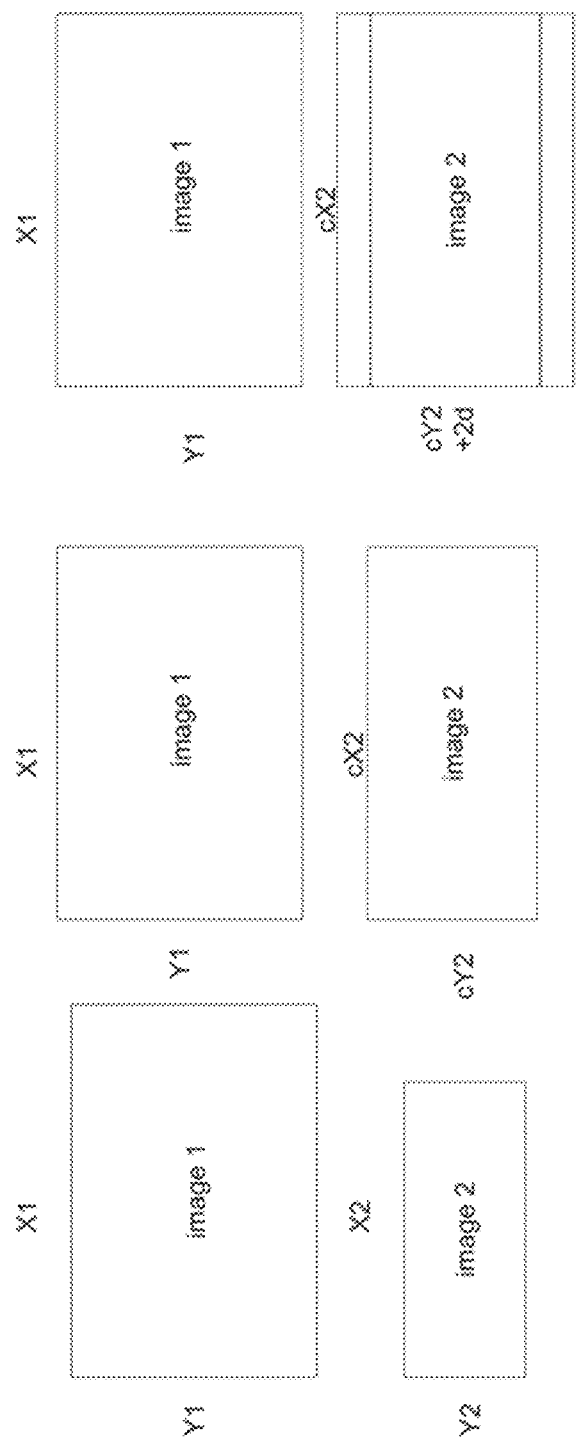

SYSTEMS AND METHODS FOR MIXING DIFFERENT VIDEOS

CROSS-REFERENCE

The present application claims the benefit of U.S. Provisional Application Ser. No. 63/074,148 filed on Sep. 3, 2020, entitled "SYSTEM AND METHODS FOR GENERATING MEDIA ASSETS", the entire disclosures of which are incorporated herein by reference.

FIELD OF THE INVENTION

The present invention relates generally to media processing, and particularly to automatically editing and mixing of different videos and audio streams from different sources.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BACKGROUND OF THE INVENTION

Social mobile video platforms and live-streaming options on online video platforms including for example YouTube, Instagram, Snapchat and social media sites such as Facebook are still growing in popularity. Accordingly, various applications and systems for digital graphic design, image editing, audio editing, video mixing and video editing known in the art provide social platforms users with tools to create a variety of media contents.

The above-mentioned video mixing and editing applications can be less than ideal in at least some respects. Prior video editing applications are time-consuming and require professional editing skills as typically the image mixing and blending, filter adding and image manipulation are all manually performed. For example, in cases where a number of video and audio media contents from different sources are combined into a single movie file, the editing process requires manually editing numerous media clips into a timeline. A layman editor (e.g. social media user) will then find it difficult and time-intensive to figure out how clips should be combined, aligned or trimmed. Furthermore, any further change in the combined video clip will require additional audio and video synchronization steps in the editing process. The layman editor will then be hesitant to make additional changes to the clip as this will require making multiple corrections in multiple places. As a result, the uploaded media clip will be unprofessional with a low chance to increase the number of media clip views.

SUMMARY OF THE INVENTION

According to a first aspect of some embodiments there is provided a method for media processing, comprising: providing at least one media asset source selected from a media asset sources library, the at least one media asset source comprising at least one source video, via a network to a client device; receiving via the network or the client device a media recording comprising a client video recorded by a user of the client device; transcoding the at least one source video and the client video, wherein said transcoding comprises: matching parameters of the client video to the parameters of the at least one source video or vice versa; parsing the client video and the source video, respectively, to a plurality of client video frames and a plurality of source video frames based on the matching; segmenting one or more frames of the plurality of source video frames to one or more character frames; detecting one or more face images in one or more frames of the plurality of client video frames and provide face markers; resizing the one or more character frames according to the face markers; compositing the resized character frames with the background frames using one or more blending methods to yield a mixed media asset frames; and encoding the mixed media asset frames to yield a mixed media asset video.

In an embodiment, the method further comprising: identifying one or more surfaces or areas in the at least one source video or the client video; and placing the one or more character frames on the identified surfaces or areas.

In an embodiment, the method further comprising: segmenting the one or more frames of the plurality of client video frames to one or more background frames; completing a silhouette formed in the one or more background frames using neural network methods to yield at least one full background frame; manipulating the full background frame around a Y axis with respect to an X-Y-Z Cartesian axis; compositing the resized character frames with the manipulated background frames using the one or more blending methods to yield composed frames; stitching the composed frames with the client video frames to yield super mixed media asset frames.

In an embodiment, the segmentation process comprises removing the background from the source video frames.

In an embodiment, the method further comprising: compositing process comprises alpha blending the resized character frames with the background frames.

In an embodiment, the method comprising: cropping or padding the plurality of client video frames to reach the ratio of the source frames.

In an embodiment, the completing background process comprises pixel prediction using a neural network or machine learning techniques.

In an embodiment, the manipulating comprises flipping the full background image in 180 deg around a Y axis with respect to an X-Y-Z Cartesian axis.

In an embodiment, the method comprising: recording the client video while playing the source video.

In an embodiment, the frame rate or bit rate of the at least one source video is different from the frame rate and or bit rate of the client video.

In an embodiment, the parameters are one or more of: frame rate, bit rate and resolution.

In an embodiment, the at least one source video comprises a source audio track and the client video comprises a client audio track and wherein the method further comprising mixing the source audio track and the client audio track.

According to a second aspect of some embodiments there is provided an apparatus for media processing, compressing: a memory which is configured to hold one or more source media asset; and a processor which is configured to: transmit the one or more source media videos to a client device; receive via the network or the client device a media recording comprising a client video recorded by a user of the client device; transcode the at least one source video and the client video, wherein said transcoding comprises: matching parameters of the client video to the at least one source video or vice versa; parsing the client video and the source video, respectively, to a plurality of client video frames and a plurality of source video frames based on the matching;

segment one or more frames of the plurality of source video frames to one or more character frames; detect one or more face images in one or more frames of the plurality of client video frames and provide face markers; resize the one or more character frames according to the face markers; composite the resized character frames with the background frames using one or more blending methods to yield a mixed media asset frames; and encode the mixed media asset frames to yield a mixed media asset video.

In an embodiment, the method further comprising a detector configured and enabled to: identify one or more surfaces or areas in the at least one source video or the client video; and place the one or more character frames on the identified surfaces or areas.

In an embodiment, the processor is further configured to segment the one or more frames of the plurality of client video frames to one or more background frames; complete a silhouette formed in the one or more background frames using neural network methods to yield at least one full background frame; manipulate the full background frame around a Y axis with respect to an X-Y-Z Cartesian axis; composite the resized character frames with the manipulated frames using the one or more blending methods to yield composed frames; and stitch the composed frames with the client video frames to yield super mixed media asset frames.

In an embodiment, the neural network methods are selected from the group consisting of: deep convolutional generative adversarial nets (DCGAN), Deep fusion network for image completion (DFNet), PathMatch algorithm, GLCIC from pytourch.

In an embodiment, the at least one source video comprises a source audio track and the client video comprises a client audio track and wherein the processor is further configured to mix the source audio track and the client audio track.

According to a second aspect of some embodiments there is provided a computer software product, comprising a non-transitory computer-readable medium in which program instructions are stored, which instructions, when read by a computer, cause the computer to provide at least one media asset source selected from a media asset sources library, the at least one media asset source comprising at least one source video, via a network to a client device; receive via the network from the client device a media recording comprising a client video recorded by a user of the client device; transcode the at least one source video and the client video, wherein said transcoding comprises: matching parameters of the client video to the at least one source video or vice versa; parsing the client video and the source video, respectively, to a plurality of client video frames and a plurality of source video frames based on the matching; segment one or more frames of the plurality of video frames to one or more character frames; detect one or more face images in one or more frames of the plurality of source video frames and provide face markers; resize the one or more character frames according to the face markers; composite the resized character frames with the background frames using one or more blending methods to yield a mixed media asset frames; and encode the mixed media asset frames to yield a mixed media asset video.

BRIEF DESCRIPTION OF THE DRAWINGS

A better understanding of the features and advantages of the present disclosure will be obtained by reference to the following detailed description that sets forth illustrative embodiments, in which the principles of embodiments of the present disclosure are utilized, and the accompanying drawings.

FIG. 3 shows a network API (Application Program Interface) infostructure comprising a single button configured and enabled to initiate the mixing of the two selected videos, in accordance with embodiments;

FIG. 4A and FIG. 4D show a flowchart of a method for media processing comprising automatically or autonomously mixing and synchronizing two or more videos from different sources, in accordance with embodiments;

FIG. 5 and FIG. 6 show respective visual examples of the steps operated by the mixing module of FIG. 2F and FIG. 2G, in accordance with embodiments;

FIG. 9 shows a resizing and padding process, in accordance with embodiments.

Figure 1:
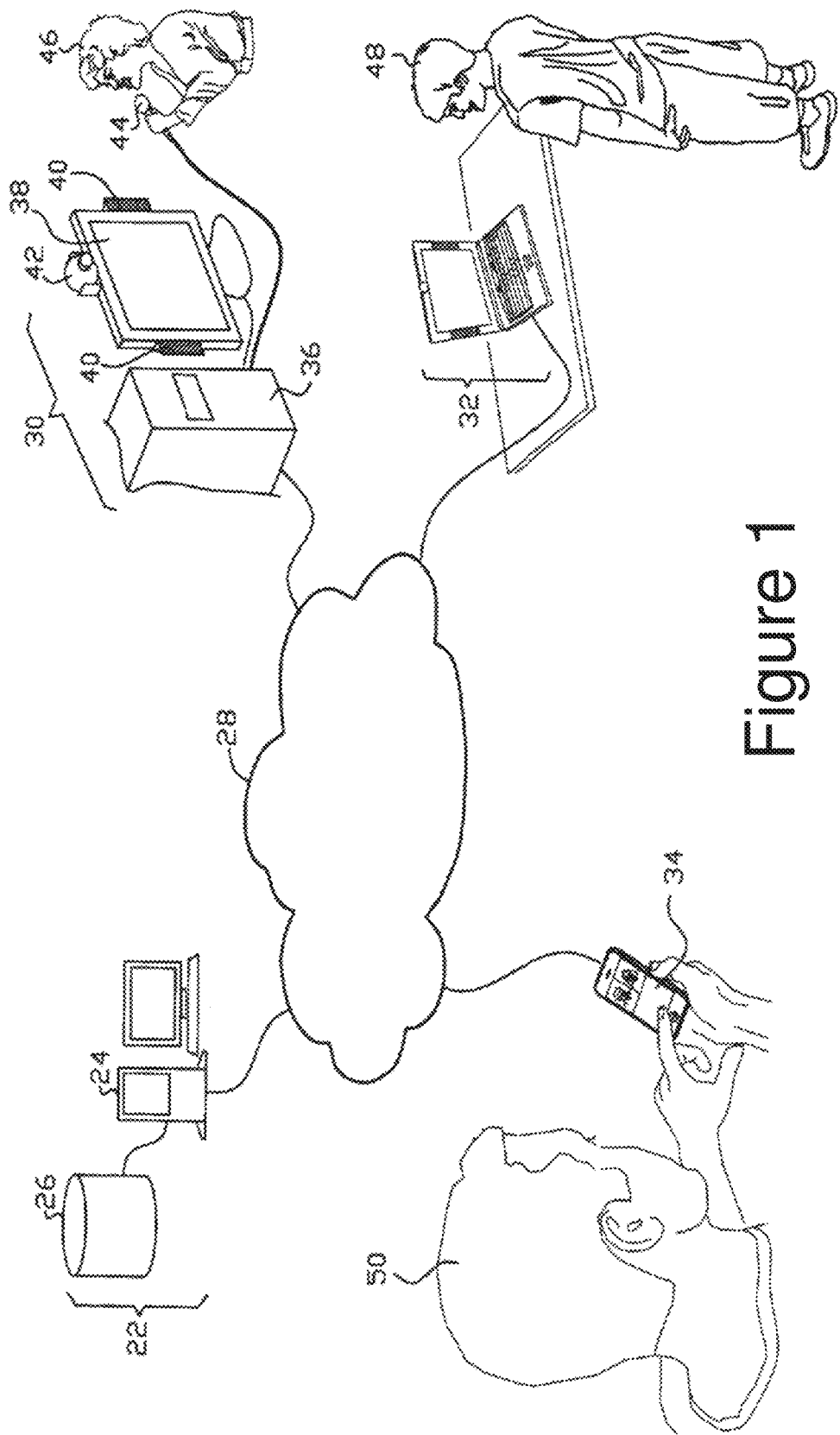
FIG. 1 is a schematic diagram of media asset/mixed media asset creation and a distribution system, in accordance with embodiments.

In the following description, various aspects of the invention will be described. For the purposes of explanation, specific details are set forth in order to provide a thorough understanding of the invention. It will be apparent to one skilled in the art that there are other embodiments of the invention that differ in details without affecting the essential nature thereof. Therefore, the invention is not limited by that which is illustrated in the figure and described in the specification, but only as indicated in the accompanying claims, with the proper scope determined only by the broadest interpretation of said claims.

DETAILED DESCRIPTION OF THE INVENTION

Prior to setting forth the detailed description of the invention, it may be helpful to set forth definitions of certain terms that will be used hereinafter.

The term 'media recording' or 'client video' or 'user video' as used herein and through the specification and claims should be understood to encompass a video such as a client or user video which may also include client audio data recorded for example by a user, for example by the client device. The client video comprises a plurality of client/user video frames.

The term 'media asset source' or a 'source video' as used herein and through the specification and claims should be understood to encompass a video which the user wishes to mix with a media recording. In some cases, the video may include audio which the user wishes to mix with a media recording. The source video comprises a plurality of source video frames. A media asset source may be or may include for example a popular video such as the Tiktok© video-sharing focused social networking service. The source video may include one or more objects such as popular characters. Alternatively, the media asset source may be or may include a media clip which is a short version of a media asset.

The term 'image asset' as used herein and through the specification and claims should be understood to encompass a video portion of the media asset source which is replaced by, or inserted to, or mixed with the media recording.

The term 'user image' as used herein is defined as a video portion of the media recording which replaces the image asset while mixed with the media asset source.

The term 'mixed media asset' as used herein and through the specification and claims should be understood to encompass a media asset source frames mixed or super mixed with a media recording frames.

The term 'super mixing' or 'super duet' or 'super-compositing' as used herein is defined as a process where the background of one of two or more videos (source video or user video) is selected as a shared background of the mixed media asset (e.g. mixed video) so the characters in the two or more videos share the same background to yield a realistic mixed video where for example the characters from the different videos look as they were captured in the same place.

Many video viewers such as social media video viewers imagine themselves joining their favorite movie star or friend video by mixing their video recording with the source video in a way that it will be difficult to realize that the two videos were captured separately in different locations. For example, a sportsman, such as a dancer or a gymnast may wish to create a video presenting video sequences of himself dancing or exercising mixed (e.g. included in the same video) with one of his favorite sportsman videos.

For example, while viewing a media asset source such as a video or movie (e.g. video sport game or computer game) for example via a sharing social networking service (e.g. TikTok or the like), social media users may wish to record their own video and combine or mix their recording with the media asset source (e.g. the TikTok video) in order to create the impression that they are part of the movie or the game.

Media recording hardware and software in personal computers and mobile devices such as smart phones and home entertainment consoles allow users to record and edit their own videos (e.g. selfie), which they can then upload to their own mobile device or to popular Web sites, such as YouTube® and Facebook® TiKToK and the like. Additionally, computing capabilities in mobile devices for interacting with network servers, such as cloud-based servers, allow mobile users to download any selected existing video source such as cartoons, video clips, etc. Mixing videos from different sources, typically from different formats, however, remains a challenge and sometimes beyond the capabilities of most users and the equipment at their disposal. In some cases, the media source is captured in a way that doesn't leave any free place for adding additional elements to the mixed media asset. For example, the media source is captured vertically and accordingly the resulted video margins are too small to include additional characters in the media source.

Recording studios enable fans and clients to implement those combined recordings but at a high cost in terms of time, money and effort.

Additionally, present mixing methods present poor mixing results where the client recording do not naturally fit the source media recording and vice versa. For example, the background and/or surrounding of the client recording and the source media recording do not match and as a result the mixing looks unrealistic and more of cut and paste mixing.

Other prior art solutions that are currently used today for combing two videos, include simply placing the two videos side by side which is also known today as 'duet' operation in applications such as social media applications (for example in TikTok). Specifically, a duet operation such as a TikTok duet is a video that gets placed beside another different video so that they can be watched simultaneously in the app. These can be a user own videos or the videos of other TikTok users who haven't disabled the duet feature.

However, the resulted duet video eventually is not a mixed video as the videos are only appearing side by side on the screen for example in a square format. Additionally, the two videos are not coherent, the background of the two videos do not match and the video frames are not synchronized and compatible.

Figure 2A:
FIG. 2A and FIG. 2B show video mixing results, in accordance with the prior art.
Figure 2B:
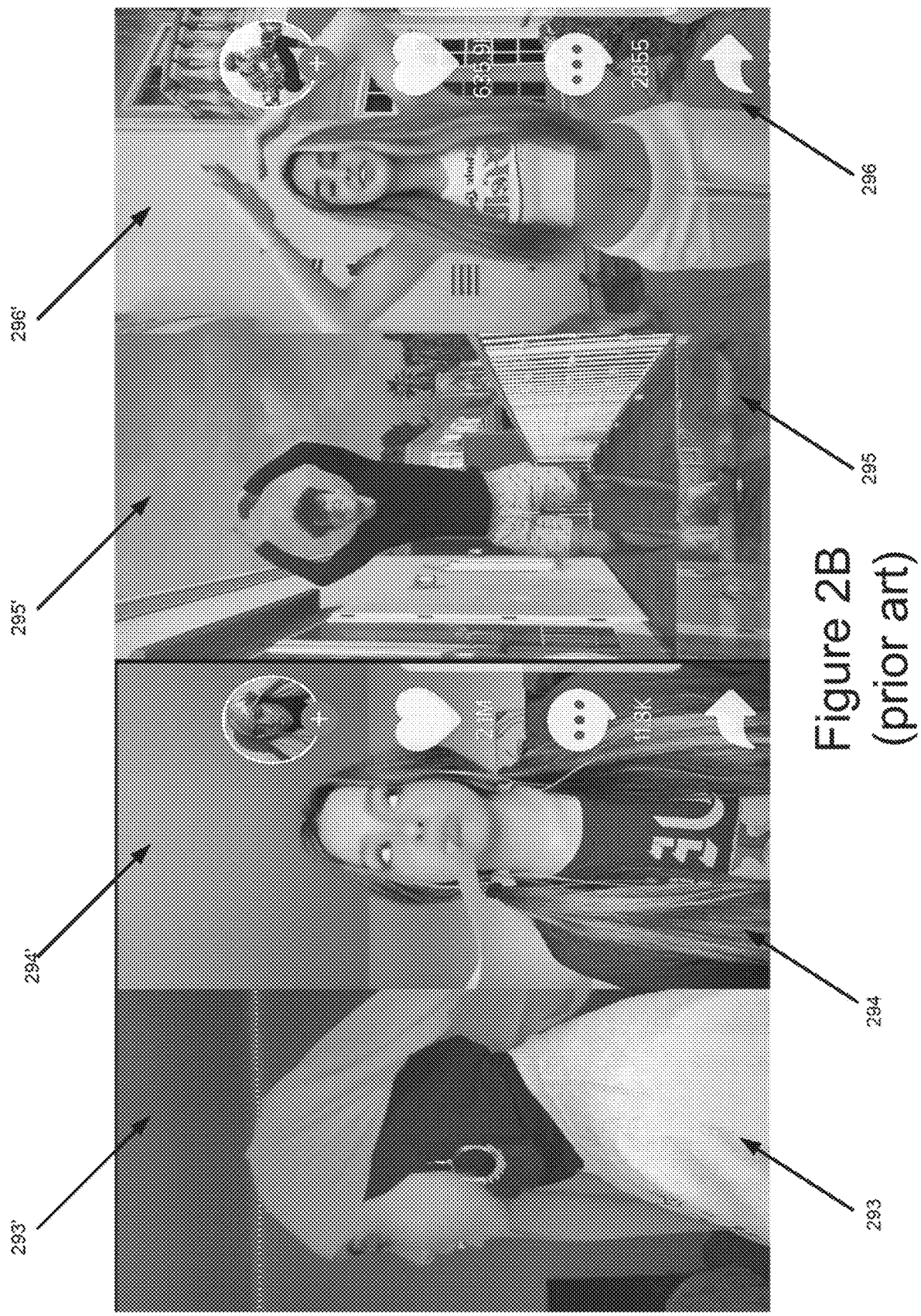

Examples of such mixing results are illustrated in FIG. 2A and FIG. 2B. FIG. 2A shows user recording 291 mixed with popular video recording 292 (media asset), while FIG. 2B shows other examples of user recordings 293 and 295 (including their selfie characters images) mixed with media assets 294 and 296 presenting their favored popular characters.

As clearly shown, the related backgrounds 291', 292', 293', 294', 295' and 296' at each related video doesn't match, and as a result, the mixing of two or more videos doesn't look natural (and doesn't provide the impression as they were captured in the same location). Additionally, the size of each figure in each separate video is different and doesn't match the size of the character included in the related mixed video. For example, the proportion of the exercising figure 287 doesn't match the proportion of the exercising figure 288.

In light of the above, improved editing and mixing of video sequences of two or more videos that overcome at least some of the abovementioned deficiencies of the prior editing and mixing methods would be beneficial. Ideally, such methods would be simple and convenient to operate, user-friendly and the resulting video mixing should be seamless and coherent.

Embodiments that are described hereinbelow address this unmet need by enabling users to mix (e.g. combine, blend and/or stitch together) and synchronize one or more media asset sources such as an existing media asset (e.g. popular video, movies or cartoons) with user media recordings (e.g. user/client video) in a simple and automatic manner. The user's media recordings may include one or more user's images or videos. Alternatively, the user recording may comprise any suitable sort of media content or element or object, such as one or more characters, for example, a selfie recording or/and a virtual reality (VR) or augmented reality (AR) character or any type of character. In some embodiments, the two or more mixed videos may be two source videos such as two videos of a talent. Alternatively or in combination, the two or more videos may be two or more user recordings.

The fuse.it API provides AR ability without any implementation needed.

Advantageously, embodiments of the present invention provide systems, devices and methods that do not need SDK (Software Development Kit), 3rd party code, or high CPU (Central Processing Unit) power. Simply, the client sends characters or videos including objects such as the characters which he wishes users will interact with/or be mixed with other videos (as regular videos—mp4 files) and the devices, systems and methods automatically or autonomously active AR processing.

The mixing of two or more videos, in accordance with embodiments, may be defined as 'super duet' or 'super mixing' or 'super-compositing' where the background of one of the two or more videos is selected as a shared background of the mixed media asset (e.g. mixed video) so the characters in the two or more videos share the same background and hence the 'super duet' provide a realistic mixed video where the characters from the different videos look as they were captured in the same place.

In some cases, the mixing of the two videos to provide a 'super duet' may include a processing method where an image asset of one of the two videos such as the image asset (e.g. user character image) of the user is removed from one video and stitched/superposed/blended to the other video while the missing background (e.g. the silhouette) which was covered by the image asset is automatically completed. A new background is generated based on one of the images and the two videos are mixed (e.g. stitched) together having a matching background and providing an impression that the two stitched videos were captured on the same location.

In the disclosed embodiments, the systems, devices or methods are configured to receive, for example via the network or via other sources, one or more media recordings wherein the media recording may comprise a source audio data and video. In some cases, the user may record a video, such as a selfie, on his device or other devices and upload his recording to the server or directly to his device. Following the upload or during the upload or while the recording is being performed (e.g. on real-time) the user may select one or more media asset sources or just objects such as characters (e.g. AR or VR characters) presented for example on the user interface menu which he wishes to mix with his recording or with direct camera input (on real-time).

The user may press the 'mixing' or 'super duet' button for automatically mixing the two videos and at the next step, the server or the user device automatically mixes and synchronizes the selected one or more media assets with the media recording to generate one or more mixed media assets which share the same background (e.g. the super duet video or image), for example, the background of the media recording or source video. Finally, the one or more mixed media assets may be displayed for example at the user's device display. Furthermore, the user may share the one or more mixed media assets via the network to other client devices by for example one or more social mobile video platforms.

FIG. 1 is a schematic diagram of a media asset/mixed media asset (e.g. super mixing) creation and a distribution system 100, in accordance with embodiments. A media server 22 comprises a processor 24 and a memory 26, which may store one or more of media assets. Memory 26 may also store a plurality of media recordings such as personal recordings of different users that processor 24 has received from user clients. In some embodiments, server 22 may be a cloud-based server. Typically, server 22 comprises a suitable general-purpose computer (or a cluster of such computers), which has been programmed in software to carry out the functions that are described herein. This software may be downloaded to the computer in electronic form, over a network, for example. Additionally or alternatively, the software may be stored on tangible, non-transitory computer-readable media, such as magnetic, optical, or electronic memory media.

Server 22 communicates over a network 28 with multiple client devices 30, 32, 34. Typically, network 28 comprises the public Internet, and server 22 communicates with the client devices via a suitable Web interface, as is known in the art. Alternatively, the server and clients may communicate using any other suitable sort of network and interface.

Client devices 30, 32, 34 may comprise, for example, desktop, laptop, or tablet computers, media consoles, personal digital assistants or smartphones, or any other sort of device with the types of network, video and audio interfaces and computing capabilities needed to interact with server 22. By way of example, client device 30 comprises a computer with a processor 36, memory, video display 38 and speakers 40 for playing media assets, along with a video camera 42 and microphone 44 for recording. Client devices 32 and 34 are similarly equipped, though in different configurations.

In operation, users 46, 48 and 50 may record their recordings (e.g. media recording, for example a selfie or any type of video recording) for example on their devices 30, 32 and 34 and upload the respective users' recordings via the network to server 22. In some cases, the users' recordings may be stored on their devices' memory. In some cases, processor 24 is configured to store the users' recordings in memory 26. Users 46, 48 and 50 may select one of the stored media assets on memory 26 or on their devices memory and request server 22 to play the selected asset mixed with any of the users' recordings. As will be further illustrated in details below in respect to FIGS. 2-6, processor 24 is configured to select or receive a selection of one or more media asset sources (e.g. popular videos) and one or more media recordings, pre-process the selected media recording and the media asset sources so both will be compatible, remove one or more selected image assets with the user's recording (e.g. image) and mix them with one or more media asset sources to create one or more mixed media assets which includes for example a mix of the user image and media asset and for example share the same background. In accordance with embodiments, the mixing includes 'super mixing' (e.g. 'super duet' which specifically comprise combing one or more of the media asset sources and one or more media recordings by placing the processed media asset on the background of media recording or the background of the media asset source. In some cases, the background is further processed to fit the size of one or more elements in the mixed media asset such as characters in the mixed media asset.

According to some embodiments, the at least one source video comprises a source audio track and the client video comprises a client audio track and the processor is further configured to mix the source audio track and the client audio track.

Once the composition process is finalized, users 46, 48 and 50 may download the mixed media asset, for example from server 22 and/or from their own devices' memory and play it on their respective client devices 30, 32 and 34 or share it via the network to a friend.

Figure 2C:
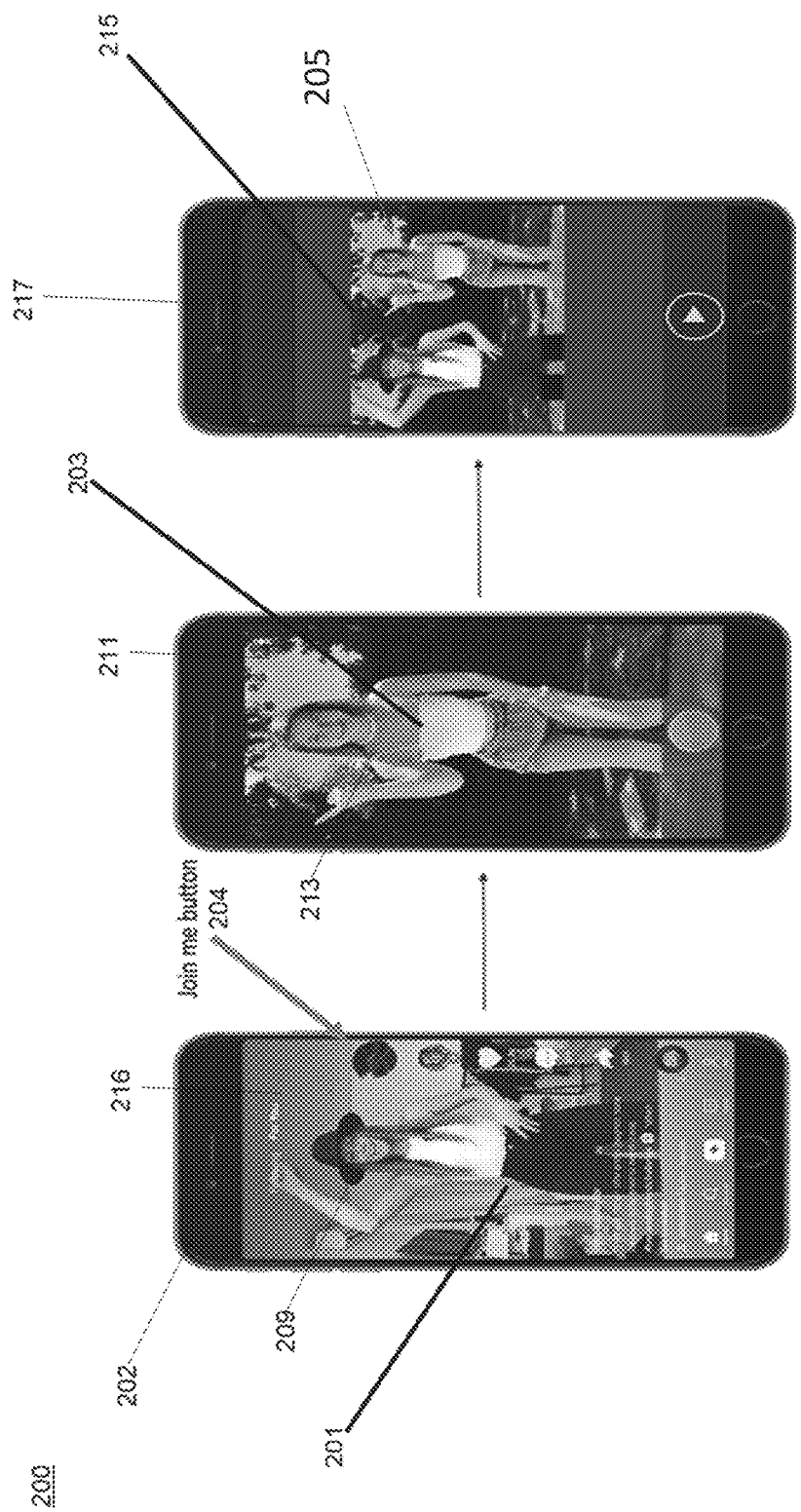
FIG. 2C shows examples of schematic representations of a user interface screens 200 which follow the steps of recording a client video and mixing it with a selected popular video, in accordance with embodiments.

FIG. 2C shows examples of schematic representations of a user interface screens 200 which follow the steps of recording a client video and mixing it with a selected popular video (e.g. source video), in accordance with embodiments. In operation, a user selects a video 201 from a list of video sources, such as a TikTok dancing video of a popular TikTok character 209 (presented for example at his mobile device 202 screen 200) which he would like to join. At the next step the user takes or selects a video such as a video 203 of himself (e.g. a 'selfie' or user recording including an image of his character 213). Afterward, the user may press a 'join me' button 204 presented on his screen 200 and immediately for example in real-time or close to real-time for example after a few seconds the two videos (201 and 203) are mixed and displayed as a mixed video 205. For example, in a few seconds (or less) each video (201 and 203) is processed, and further mixed together to yield the mixed video 205. In some cases, the mixed video is further processed to yield a realistic video including for example the same background for both characters 209 and 213 (e.g. in a super duet mixing process).

In accordance with embodiments, a processed version of the background 216 of the source video or background 211 of the user recording may be selected as the background (e.g. shared background') of the mixed video 205. In some embodiments, the user may select a different background for the two mixed videos. Typically, the selected background is the user recording background 211 accordingly, in accordance with one embodiment, as shown in FIG. 2C background 211 of the user recording is used as the 'shared background' 215 of the mixed video.

According to one embodiment, the default selected background is the user's background flipped and stitched. According to another embodiment, the user selects a new background from a gallery of backgrounds or upload an image that will become the new background.

In accordance with embodiments, the 'shared background' may be defined as a new single background formed based on a selected background and used as a shared background for the mixed video.

According to other embodiments, in operation, a user may first select the video 201 from a list of video sources, such as a TikTok dancing video of a popular TikTok character 209 (presented for example at his mobile device 202 screen 200) which he would like to join. At the next step the user takes or selects a video such as a video 203 of himself (e.g. a 'selfie' or user recording including an image of his character 213 or any other video), and automatically, once he completes taking his video 203 the two videos are automatically mixed (e.g. super mixed) together to yield the mixed video.

Figure 2D:
FIG. 2D and FIG. 2E show respectively mixed videos which include super mixing two or more characters to a single video including a shared background, in accordance with embodiments.
Figure 2E:

FIG. 2D and FIG. 2E show respectively mixed videos 283 and 285 which include super mixing two or more characters to a single video including a shared background, in accordance with embodiments. As shown in FIG. 2D the exercising characters 287' and 288' shown in FIG. 2D now have a reasonable same proportion and share the same background in the mixed video 283. As a result, the mixed video 283 provides a more realistic video (than video of FIG. 2A) presenting two characters exercising in the same location, though they were captured in different locations.

Figure 2F:
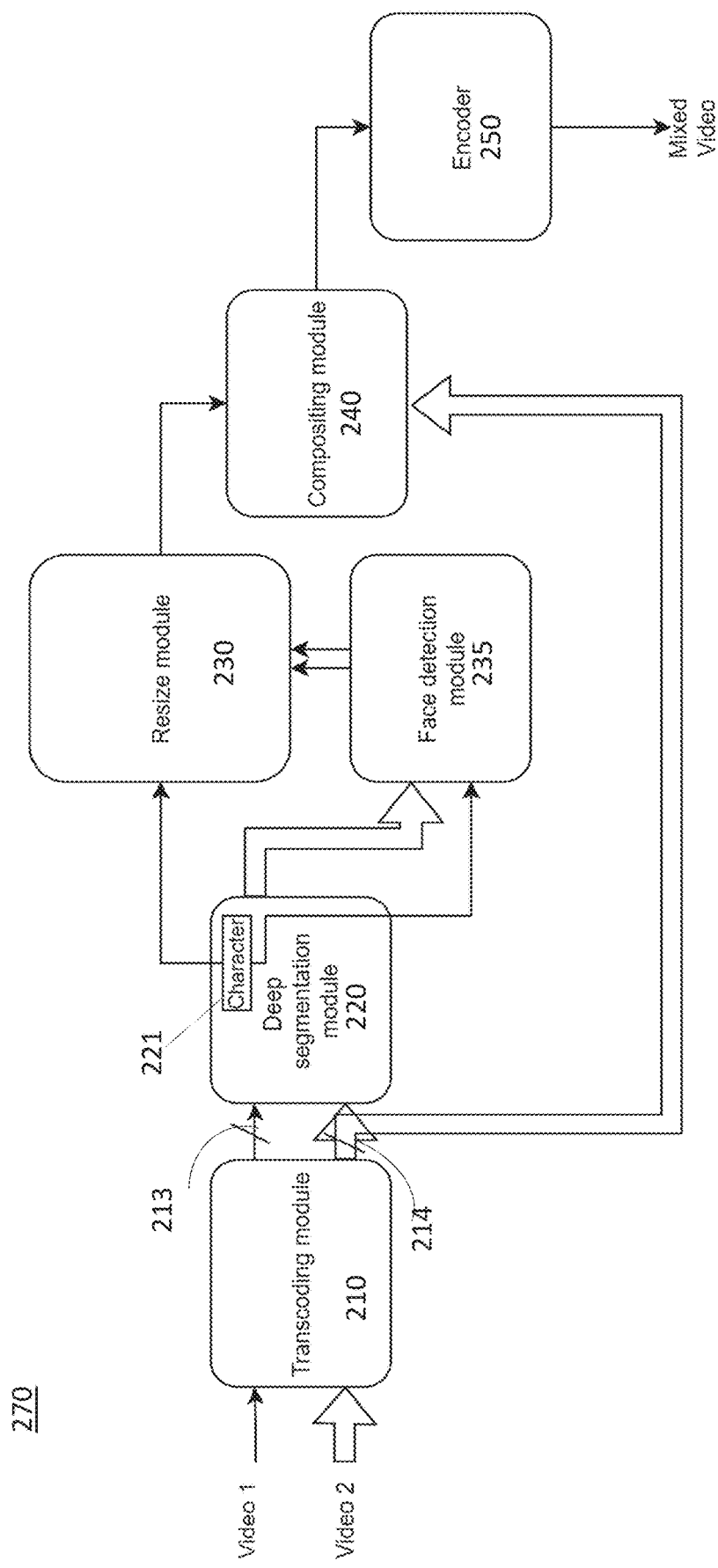
FIG. 2F, FIG. 2G and FIG. 2H show a block diagrams of video mixing modules configured and enabled to mix two or more videos such as one or more media assets with one or more media recordings, in accordance with embodiments.

FIG. 2F shows a block diagram of video mixing module 270 such as an automatic real-time video mixing module configured and enabled to mix two or more videos on shared background, in accordance with embodiments.

Specifically, in accordance with embodiments, the video mixing module 270 is configured to receive a first input (video 1) such as an existing media asset source (e.g. a source video comprising one or more source videos in the form of GIF, MP4 etc.), selected for example from a source video gallery and a second input (video 2) including for example a user recorded video (e.g. client/user video) and process the two received inputs on a shared background and generate a mixed media asset comprising, for example a seamless, coherent, synchronized format of the two received inputs including the shared background which naturally match the two mixed videos.

In some cases, the video mixing module 270 may be executable by one or more processors such as the processor 36 of client device 30, or processor of client devices 32 and 34 or processor 24 as illustrated in FIG. 1.

In some cases, the two or more mixed videos are different videos having different video parameters such as different frame rate, resolution etc.

Figure 6:
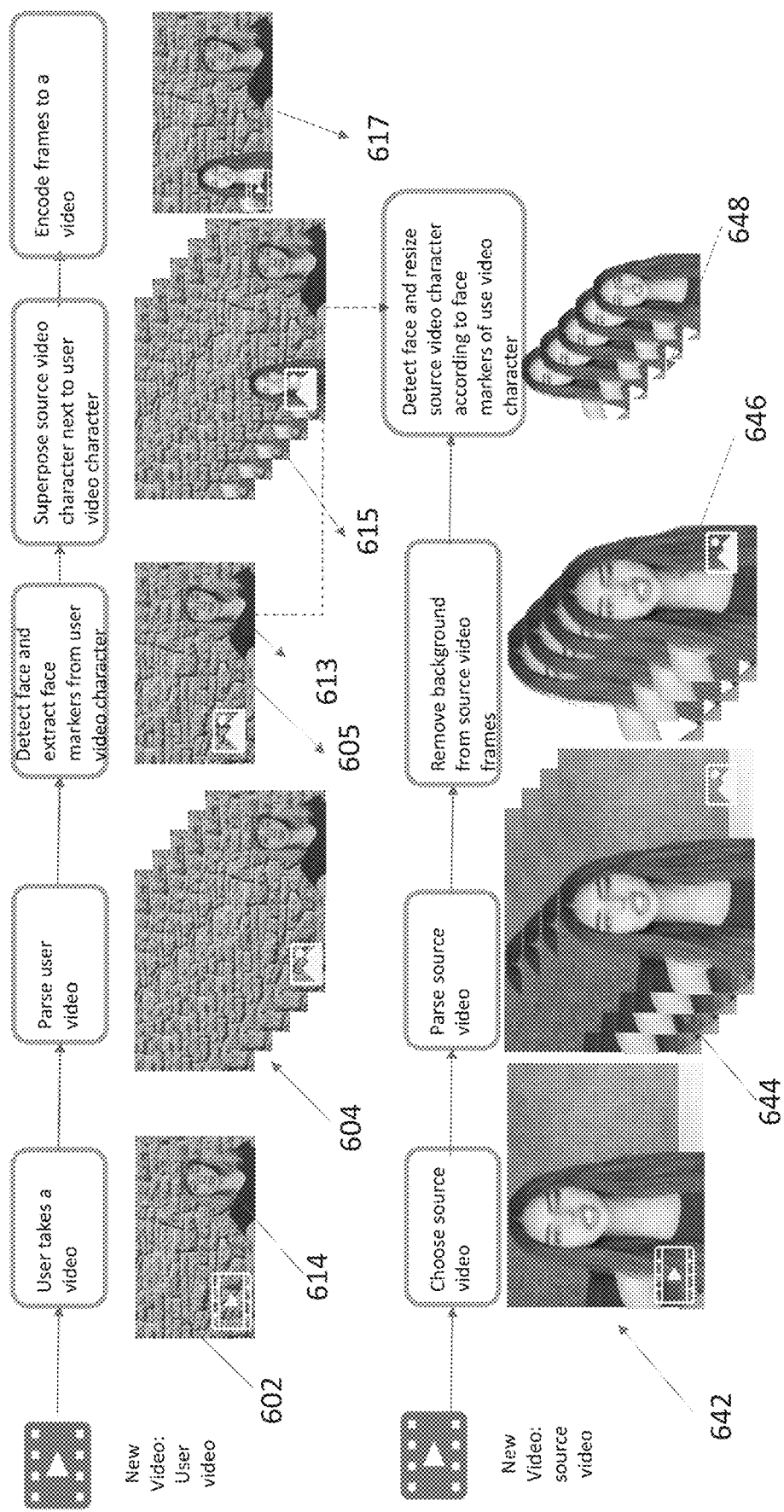

The detailed description of module 270 of FIG. 2F is followed by visual image examples of the processing steps as illustrated in FIG. 6, in accordance with embodiments.

According to one embodiment, the video mixing module 270 may include a transcoding module 210, a deep segmentation module 220, a resize module 230 a face detection/recognition module 235, a compositing module 240, and an encoder module 250. These modules may be in communication with one another in accordance with embodiments.

The transcoding module 210 is configured to receive, for example in real-time and/or simultaneously, the first input including for example the existing media asset source (e.g. video 1—in the form of for example GIF or MP4, or the like), downloaded for example from the server 22, and the second input including for example the user recorded video (e.g. video 2-client video in the form of for example GIF or MP4, or the like), as recorded by imaging means for example at the user's 50 mobile device 34. Once the two videos are received the module 210 transcode one video's parameters according the other video parameters, for example concurrently. Specifically, the transcoding includes matching or comparing video 2 parameters according to video 1 parameters, or vice versa, so both will have the same or almost the same parameters. The parameters may include for example resolution and/or bit rate and/or frame rate. Based on the parameters' compression/matching of video 2 to video 1, video 1 and/or video 2 are parsed respectively to yield a plurality of source video frames 213 and client video frames 214. More specifically, the transcoding includes matching the frame rate and/or the resolution of the user recording video frames to the frame rate and/or the resolution of the media asset source video frames.

An example of the transcoding process is illustrated in FIG. 6, where the user video 602 (e.g. client video) is parsed to a plurality of client video frames 604. In parallel, a selected source media asset (e.g. source video) is also parsed to a plurality of source frames 519 as illustrated in FIG. 5.

The Deep Segmentation module 220 receives as an input one or all frames of the plurality of source frames 213 (e.g. an image of each of the parsed frames) and segments (e.g. separate/divides the image) to two images-character image(s) (e.g. element pixels image 221) and in some cases also to the background (e.g. background pixel image). In some embodiments, the segmentation includes removing the background (e.g. background pixels) from the plurality of source video frames.

In some cases, the user recording is selected to be segmented, as typically the user background is selected as the shared background for both videos (e.g. for the user video and the source video), however, other videos may be segmented such as the source video.

In accordance with some embodiments, the segmentation is operated based on Neural Networks (AI) methods.

Figure 8:
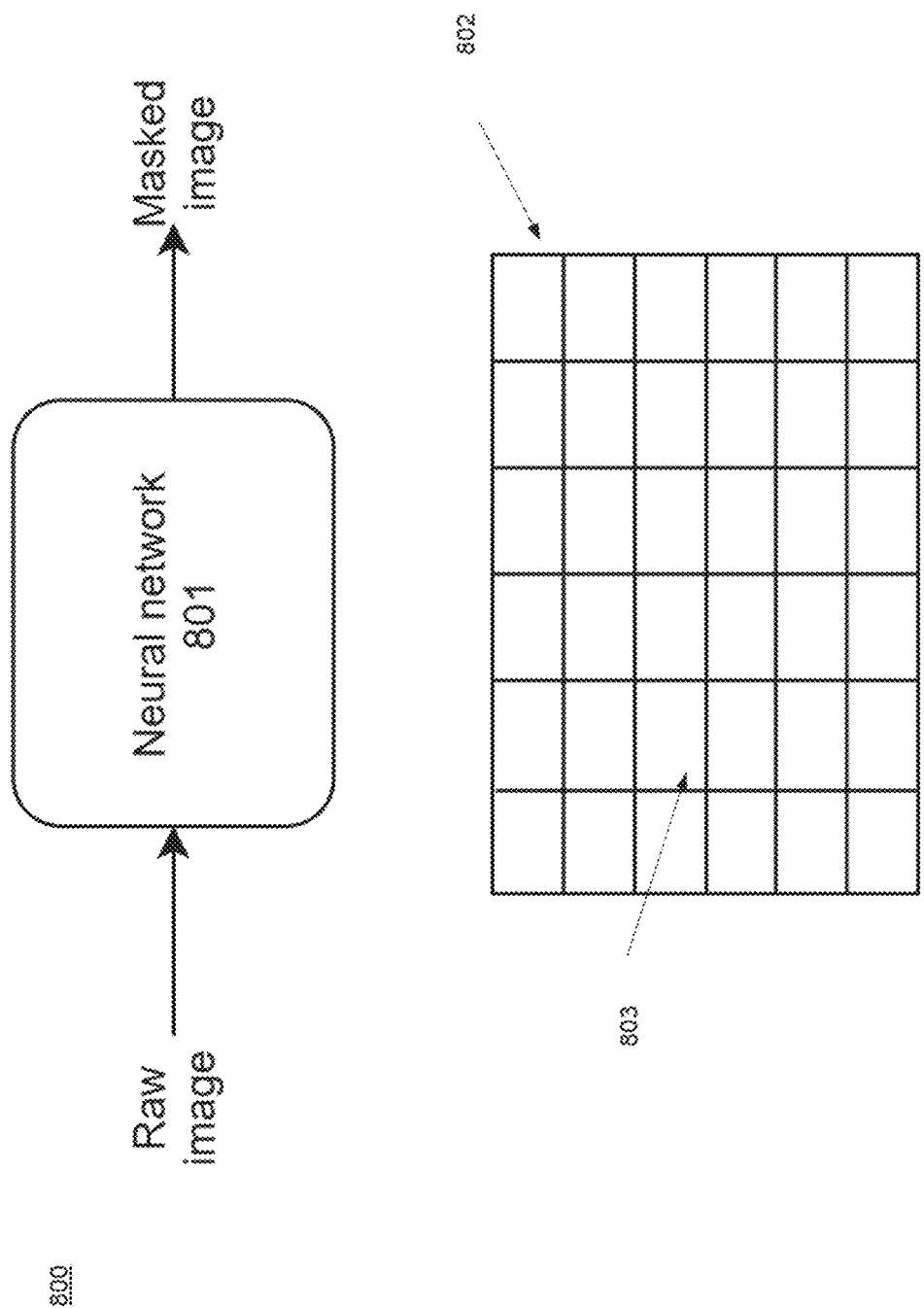
FIG. 8 shows an example of a segmentation process, in accordance with embodiments.

FIG. 8 shows an example of a segmentation process 800, in accordance with embodiments.

In operation raw image of for example, the client video or source video is received at a neural network 801 to yield masked image 802 (a binary image consisting of zero- and non-zero values) including a plurality of pixels 803. The neural network predicts and classifies each pixel 803 of the image 802 as foreground or background pixel.

An example of the segmentation process, according to one embodiment, is illustrated in FIG. 6 where the background pixels of the source video frames 644 are removed to yield character source frames 646.

The face detection/recognition module 235 receives as an input one or more frames (e.g. images) character image and detects a face in the image to yield face markers which include the coordinates of the face parameters. In accordance with embodiments, there are two sets of face markers: one for the current image and one according to the image/frame/character/element which should be resized.

Specifically, the face detection/recognition includes detecting/recognizing the position of one or more face images or face elements at each of the received videos (e.g. a face image in the first video and another face image in the second video). In some cases, the detection is performed using any appropriate detection methods, such as face detection algorithms, non-limiting examples of such algorithms include:

SMQT Features and SNOW Classifier Method (SFSC)
Efficient and Rank Deficient Face Detection Method (ERDFD)
Gabor-Feature Extraction and Neural Network Method (GFENN)
An efficient face candidates selector Features Method (EFCSF)

Specifically, the face detection process includes detecting at each of the received videos (e.g. the existing media asset source and/or user recorded video) one or more face images, for example, a single face image, and marking by one or more markers (e.g. face markers) the detected face images. In some embodiments, the existing media source may be a video GIF and the markers are superposed on the detected face image of the video GIF, for marking the position and location (e.g. coordinates) of the face image at the GIF video. In some embodiments, the markers may indicate the location of face elements such left eye position, and/or right eye position and/or mouth position for each detected face image.

Specific examples of the face detection and resize process are illustrated in the present applicant issued U.S. Pat. No. 10,734,027 incorporated herein by reference in its entirety.

The Resize module 230 receives as an input the plurality of frames and the two face position markers for the source face and target face (the two sets of face markers) and resizes the received image according to the received face markers. For example, the plurality of source frames (e.g. each parsed image) are resized according to the face markers extracted from the plurality of client frames.

An example of the face detection/recognition and the resizing process is illustrated in FIG. 6, where the face 613 of the character 614 in the user recording is identified (for example at one of the client frames 605 of the plurality of user video frames 604) and face markers of the identified face are extracted. Additionally, a face of the character of the plurality of client frames 646 are identified and accordingly the source video character images 646 are resized to yield resized character source images 648 according to the extracted face markers of the user character so as to keep the characters in the client and source video in the same proportion and/or size.

The compositing module 240 receives the resized source character images of video 2 and blends them into video 1 to yield mixed video frames (e.g. mixed media or one or more composed frames) using for example known blending methods such as alpha blending, chroma key filtering blending, multiplying blending, screen blending, overlay blending, divide addition, subtract, difference blending etc.

Specifically, as illustrated in the related FIG. 6, the plurality of resized source video character frames 648 are superposed next to the plurality of user character frames 604 to yield the mixed video frames 615 (e.g. mixed media).

The encoder 250 is configured to receive the plurality of mixed video frames 615 and encode them into a mixed video. For example, as shown in FIG. 6 the plurality of mixed video frames 615 are encoded into mixed video 617 which included the source character and the user character positioned one next to the other.

In some embodiments, each video such as video 1 or 2 comprises audio tracks (e.g. different audio tracks) and the systems, devices and methods are configured and enabled to mix the audio tracks. For example the at least one source video comprises a source audio track and the client video comprises a client audio track and the processor is further configured to mix the source audio track and the client audio track. Specific examples of the audio track mixing process are illustrated in the present applicant issued U.S. Pat. No. 8,782,176, filed on Apr. 12, 2012 and incorporated herein by reference in its entirety.

Mixing System and Methods Comprising Surface/Area Detection

In cases where the characters in the videos (source and/or user videos) are fully imaged characters including an image of the characters complete body or almost complete body (For example the character's image includes an image his legs), accordingly, the methods and systems in accordance with embodiments are configured to identify automatically and/or autonomously one or more surfaces or specific areas in the videos (source and/or client video) and place the characters on the surface/area so the mixed image will look realistic. An example of such a result is illustrated in FIG. 2E.

Figure 2G:
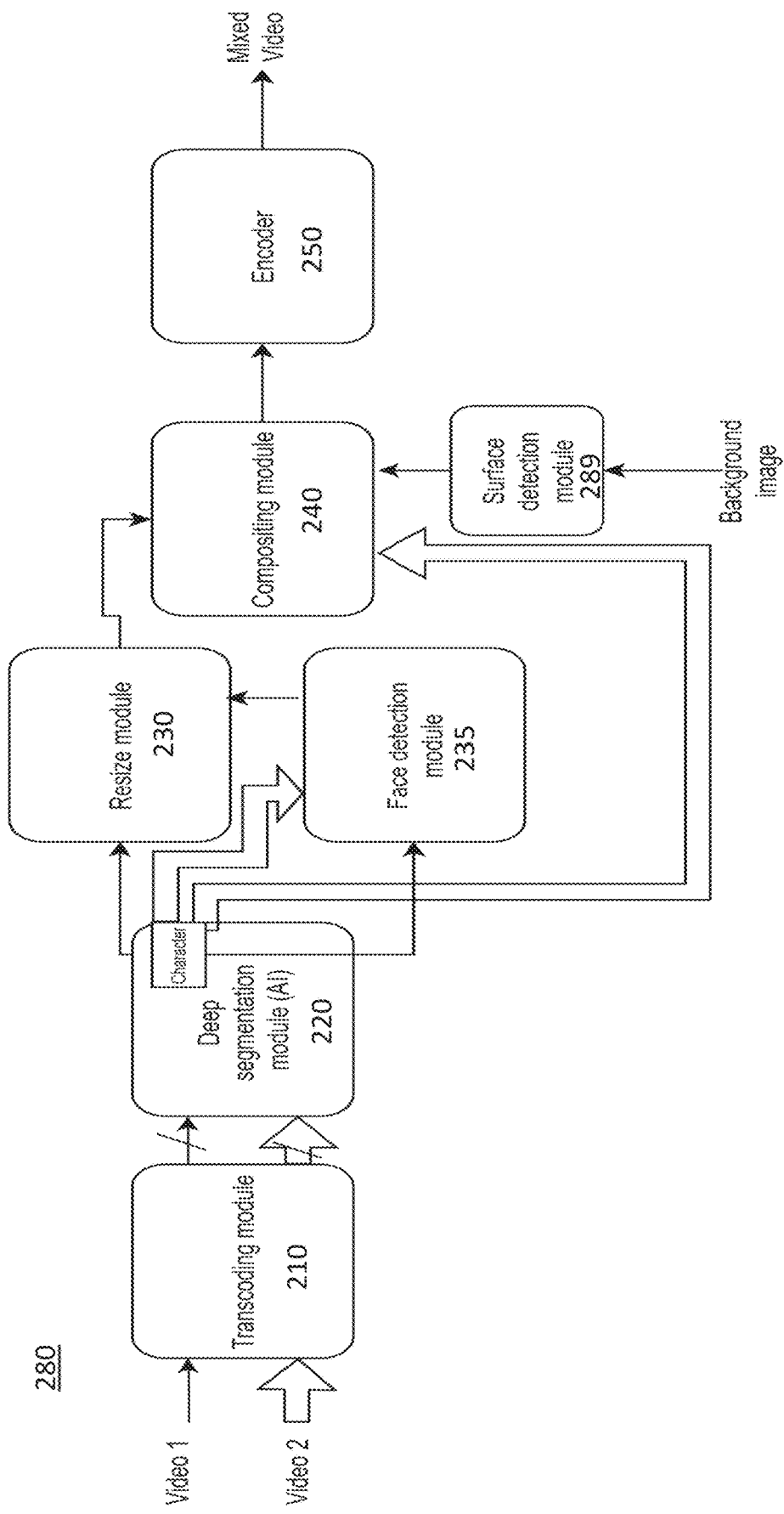

FIG. 2G shows a block diagram of video mixing module 280 such as an automatic real-time video mixing module 270 configured and enabled to mix two or more videos such as one or more media assets sources with one or more media recordings, in accordance with embodiments. Specifically, the video mixing module 270 is configured to receive a first input (video 1) such as an existing media asset source (e.g. comprising one or more source videos in the form of GIF, MP4, etc.), selected for example from a source video gallery and a second input (video 2) including for example a user recorded video (e.g. client video) and process the two received inputs to generate a mixed media asset comprising, for example, a seamless, coherent, synchronized format of the two received inputs including a shared background which naturally match the two mixed videos. In some cases, the video mixing module 270 may be executable by one or more processors such as the processor 36 of client device 30, or processor of client devices 32 and 34 or processor 24 as illustrated in FIG. 1.

The mixing module 280 illustrated in FIG. 2G includes the modules included in the mixing module 270, and further a surface detection module 289. The surface detection module 289 is configured to receive one or more segmented background images as segmented for example by the segmentation module 220, and identify one or more surfaces in the background and place the one or more characters of video 1 and/or video 2 on the detected surfaces. In some cases, the detected surface or area may be a surface area such as a flat surface, e.g. floor, table or chair or other locations where the selected object (e.g. character) of the media asset source and/or media recording naturally fit. In some cases, the detected area is the area that is optimal for placing and mixing the object of the media asset. For example, as shown in FIG. 2D and FIG. 2E the surface detection module 289 detects the grass as the optimal surface to place the two and three characters.

In some cases, the detection comprises identifying and selecting automatically one or more areas or elements in the client video or source video using an area detector module; generating a mesh orthogonally to the identified area; projecting the respective media asset on the generated mesh; generating an alpha map on the generated mesh; replacing and deleting selected pixels according to the generated alpha map to yield a mixed media assets where the characters are placed on the identified area.

Examples of surface/area detection methods and systems are illustrated in the present applicant issued U.S. Pat. No. 10,811,052, incorporated herein by reference in its entirety.

Mixing System and Methods Comprising Completion and Stitching

In some cases, the mixing of two video such as two different videos, for example a source video and a client video is more challenging as there is not enough space on the background of one of the videos (source video and/or client video) to place together the elements or objects (e.g. the characters) of each video together, for example, one next to the other. Systems, devices and methods in accordance with embodiments are configured and enabled to automatically and/or autonomously identify such cases and select one of the video's background and enlarge the selected background so it will have enough place to include elements or objects from both videos.

For example, the background of the user character 203 shown in FIG. 2C is not large enough to include and mix together the popular character 209 and the user character 203. Accordingly, the systems and methods of the present invention are configured to identify such cases and enlarge one of the backgrounds to include both characters in the same enlarged background. According to some embodiments, such cases are identified according to one or more criteria including, for example measuring the one or more objects size (e.g. character(s) size) with respect to the frame size and if the size of the measured objects is more than a predefined threshold. For example, if the character fills more than 50% of the frame width then the mixing includes completion and stitching a background as will be illustrated herein below. Typically, the selected background to include and mix together characters from each video is the user video background as usually social media users wish to mix and paste their favorite character in their background as for example shown in FIG. 2C where the user and her favorer celebrity dancer one next to the other in the user's backyard.

It is stressed that any selected background may be chosen by the user or automatically from any video such as the user video or the source video.

Figure 2H:
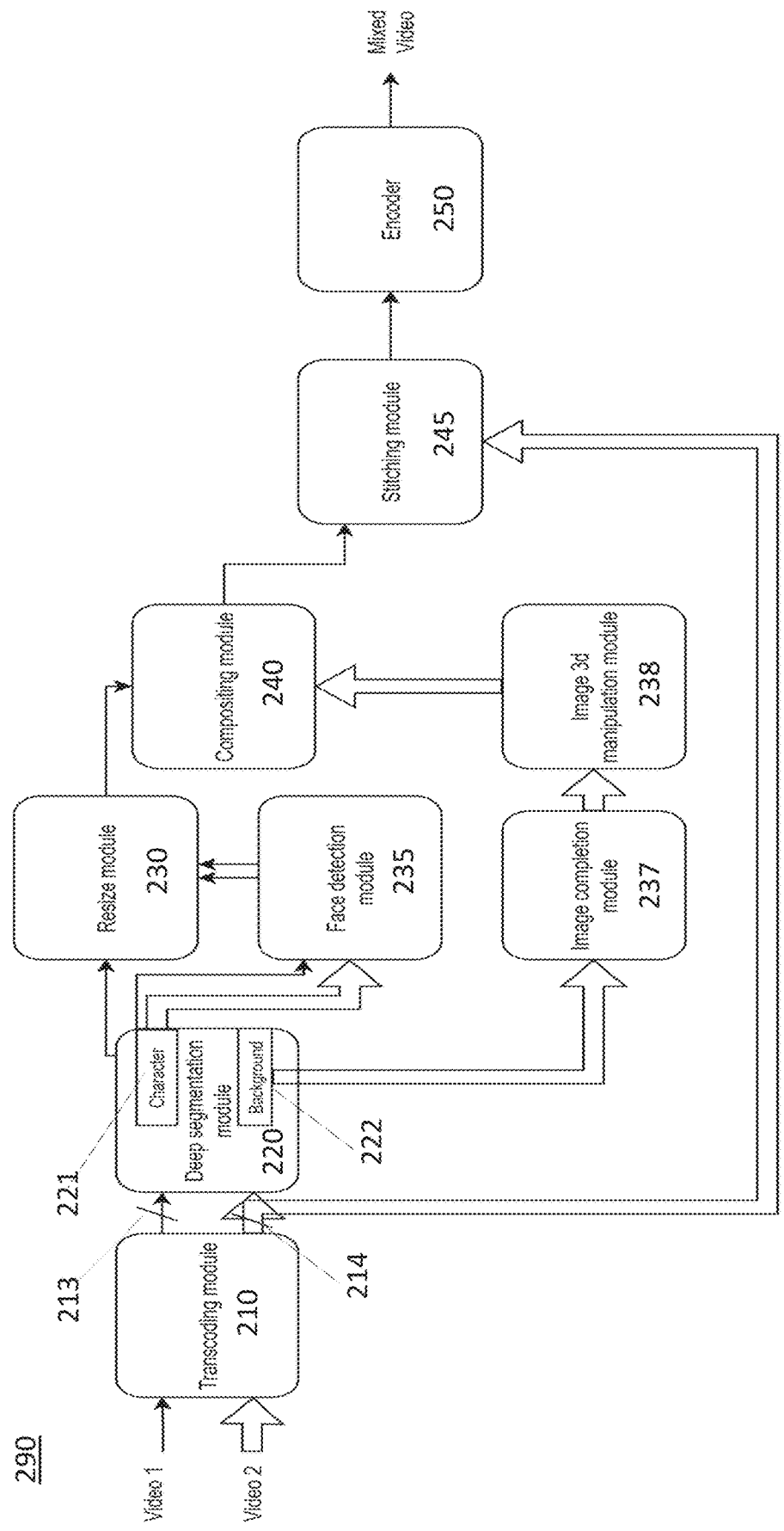

FIG. 2H shows a block diagram of video mixing module 290 such as an automatic real-time video mixing module 270 configured and enabled to mix two or more videos such as one or more media assets sources with one or more media recordings and enlarge a selected background video such as the background of one or more media assets or one or more media recordings to generate a new shared background, in accordance with embodiments. Specifically, in accordance with embodiments, the video mixing module 290 is configured to receive a first input (video 1) such as an existing media asset source (e.g. comprising one or more source videos in the form of GIF, MP4, etc.), selected for example from a source video gallery and a second input (video 2) including for example a user recorded video (e.g. client video) and process the two received inputs to generate a mixed media asset comprising, for example, a seamless, coherent, synchronized format of the two received inputs including a shared background which naturally match the two mixed videos. In some cases, the video mixing module 270 may be executable by one or more processors such as the processor 36 of client device 30, or processor of client devices 32 and 34 or processor 24 as illustrated in FIG. 1.

According to some embodiments, the video mixing module 290 may include a transcoding module 210, a deep segmentation module 220, a resize module 230 a face detection/recognition module 235, an image completion module 237, an image 3D manipulation module 238, a compositing module 240, a stitching module 245, and an encoder module 250 which may be in communication with one another in accordance with embodiments.

The transcoding module 210 is configured to receive, for example in real-time, the first input including for example the existing media asset source (e.g. video 1—in the form of for example GIF or MP4, or the like), downloaded for example from the server 22, and the second input including for example the user recorded video (e.g. video 2-client video), as recorded by imaging means for example at the user's 50 mobile device 34 and transcode one video's parameters according the other video parameters, for example concurrently. Specifically, the transcoding includes comparing/matching video 2 parameters according to video 1 parameters. The parameters may include for example bit rate and/or frame rate and/or resolution. Based on the parameters' compression of video 2 to video 1, video 1 is parsed to yield a plurality of frames 214. More specifically, the transcoding includes matching the frame rate and/or the resolution of the user recording video frames to the frame rate and/or the resolution of the media asset source video frames.

The face detection/recognition module 235 and the Resize module 230 are operated as explained herein above with respect to FIG. 2F.

The Deep Segmentation module 220 receives as an input each frame or a single frame of a plurality of frames 214, for example, an image of one or each of the parsed frames and segments (e.g. separate/divides the image) to two images-character image(s)(e.g. element pixels image 221) and background (e.g. background pixel image 222).

In accordance with some embodiments, the segmentation is operated based on neural network pixel prediction methods such as methods described herein below.

Figure 7:
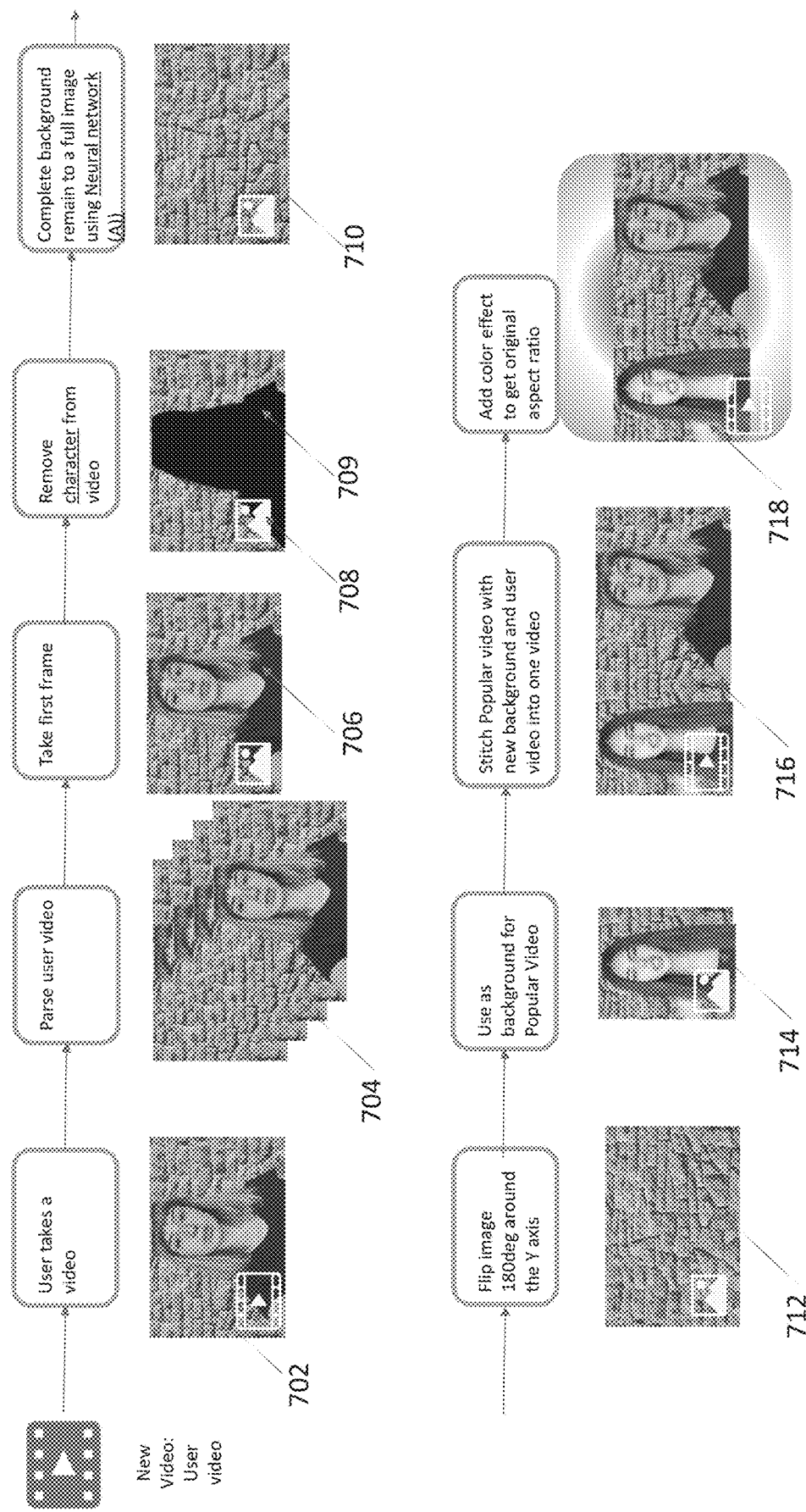
FIG. 7 show related visual image examples of the processing steps of respectively FIG. 2H FIG. 2G FIG. 2H and FIG. 4A, in accordance with embodiments.

More specifically, an image illustration of the segmentation process of FIG. 2H is illustrated in FIG. 7. In accordance with embodiments, the first frame 706 of the plurality of user frames is selected and as part of the segmentation process and the user character image is removed from the first frame forming a user background frame 708 comprising silhouette 709 in the background frame 708

The image completion module 237 receives as an input the background image 222 and completes missing parts of the image. Specifically, the module completes the character's silhouette (which was segmented by the deep segmentation module 220) in the background image and generating a complete background image.

For example, as shown in FIG. 7 the silhouette 709 in user background frame 708 is completed using neural network methods to yield a full image 210. Specifically, the shadowed character image (silhouette 709) is completed and now is presented as a full wall of stone background image 710.

The Image 3D manipulation module 238 receives as an input the completed background image and manipulates (e.g. flips) the image around an XYZ axis to yield a manipulated image. Specifically, the manipulation comprises, in accordance with embodiments, flipping the new and full background image(s) for example in 180 deg around a Y axis with respect to an X-Y-Z Cartesian axis, A visual illustration of the manipulation process is illustrated in FIG. 7 where the full wall of stone background image 710 is flipping the new and full background image(s) for example in 180 deg around a Y axis with respect to an X-Y-Z Cartesian axis forming the flipped image 712 (e.g. the full background, in other words, is the user background and a mirror image of the user background stitched together).

The compositing module 240 receives the manipulated background image and resized character image of video 1 and blends the two images into one single image (e.g. mixed image or one or more composed frames) using for example known blending methods to yield a blended frame. The blending methods may include alpha blending, chroma key filtering blending, multiplying blending, screen blending, overlay blending, divide addition, subtract, difference blending, etc.

A visual example of the blending method is illustrated in FIG. 7 where the flipped image and the source video (e.g. resized source characters are blended) to yield the blended video 714.

The stitching module 245 receives the blended image of video 1 (e.g. including the resized source character) and each image of video 2 (e.g. the user media recording) and stitches the two images into one image yielding a mixed image (e.g. super duet mixed image).

A visual example of the blending method is illustrated in FIG. 7 where the blended video 714 and the user video 706 (e.g. which was already resized) are stitched together to yield the a mixed video 716.

In some embodiments, the mixed images are encoded using an encoder module 250. The encoding includes encoding the plurality of mixed video frames to a mixed video (e.g. super duet mixed video). In some cases, the mixed video is filtered such as color filtered as illustrated in FIG. 7 where a color filtering process on the mixed video 716 to yield color fileted video 718.

FIG. 3 illustrates possible processing options, in accordance with embodiments. In some embodiments, the two or more videos (such as video 1 and video 2 of FIG. 2F) may be pre-processed online or offline at the client side 302, for example at the user mobile devices such as devices 34 or 38 or 30 shown in FIG. 1.

In some cases, the received videos may be processed for example at a cloud 306 by a processor such as processor 24 to yield the mixed video (e.g. joint video) 310 as shown in FIG. 2F.

Figure 4A:
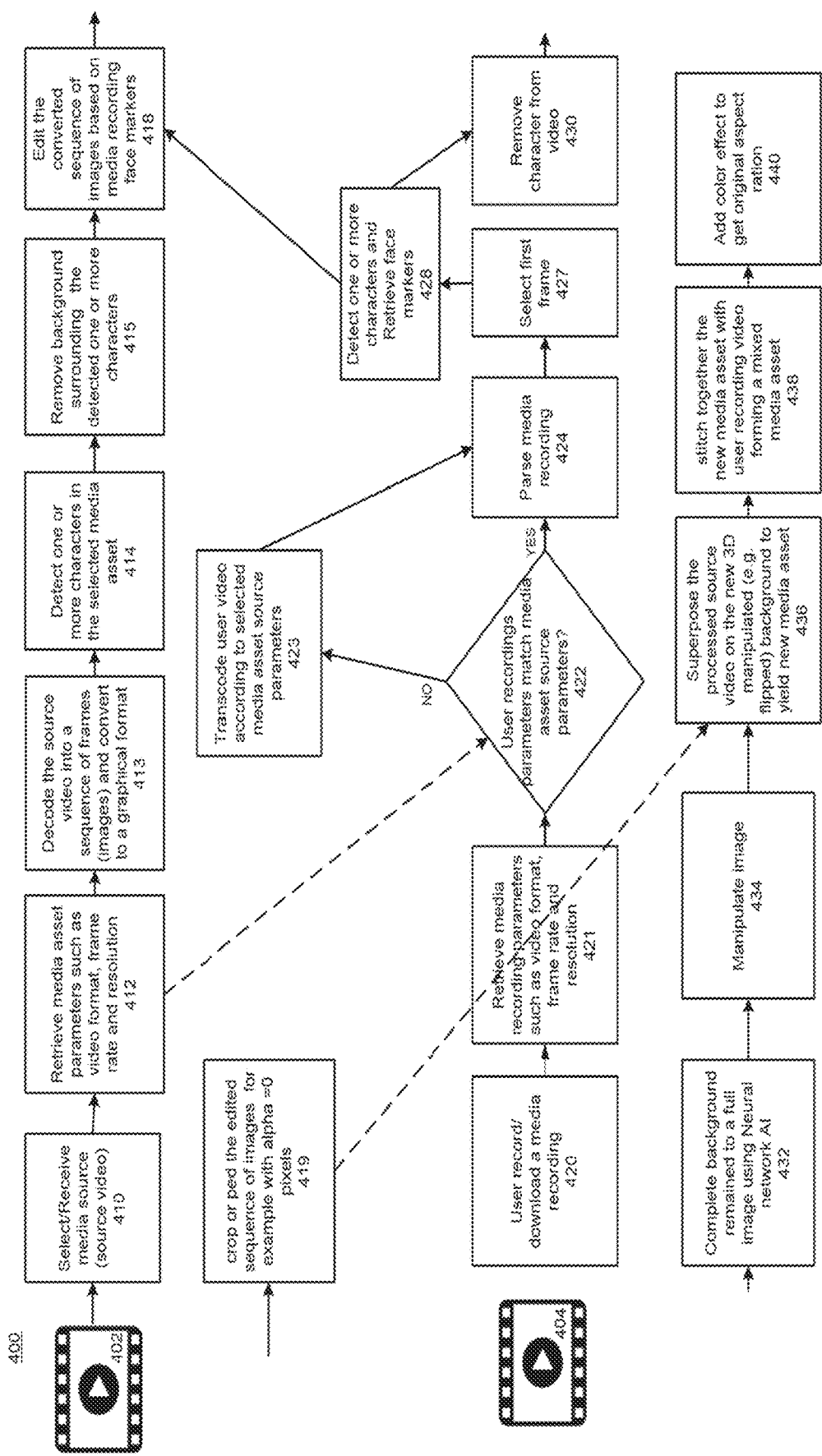

FIG. 4A shows a flowchart of a method 400 for media processing comprising automatically or autonomously mixing and synchronizing two or more videos from different sources, such as mixing and synchronizing one or more media asset sources with one or more media recordings to provide one or more mixed media assets, in accordance with embodiments. Specifically, in one embodiment, method 400 comprises mixing selected one or more popular videos (e.g. media asset sources) with one or more user video recordings (e.g. media recordings). More specifically, the media asset sources include one or more image assets such as one or more objects or characters (e.g. popular characters for example movie or TikTok video stars and talents) and the media recordings may include other characters such as video images of the user. In accordance with embodiments, method 400 may be operated using the modules illustrated in FIG. 2F or FIG. 2G or FIG. 2H. At step 410 the one or more media asset sources including the one or more objects or characters are selected by the user or automatically by a processor, for example from a media asset sources library list including media asset sources. For example, a selected media asset source 402 may comprise source video data and source audio data. In some cases, the one or more media asset sources may be downloaded via the network, which may include the media asset sources library, to the user device. According to some embodiments, the selected one or more media asset sources are received for example at one or more processors or storage units such as processors or storage units of the user's mobile device and/or at processors or storage units of a cloud-based servers and processed according to the following steps: at step 412 the media asset sources parameters of the source media asset sources are retrieved for further use at step 422. The parameters may be embedded in the received video header and may include one or more of: bitrate and/or video format and/or frame rate and/or resolution etc. At step 413 the character(s) source video is decoded into a plurality of frames such as a sequence of frames. In accordance with embodiments, each frame of the sequence of frames may be a two-dimensional grid of pixels. In some cases, the resolution and pixel byte representation of the images is determined by the original video which was parsed. In some embodiments, the sequence of frames is converted to a graphic file format such as PNG format (portable network graphics) or other formats such as jpg, jpeg, bmp, and the like. At step 414 one or more objects or elements such as character(s) in the source media asset are identified, using for example detection or recognition methods and accordingly at step 415 the background surrounding the one or more detected characters in the video source are removed using for example convolutional neural network methods to yield character(s) source video(s). In some cases, the source media asset elements or objects (e.g. characters) and background as identified in steps 414 and 415 are segmented using the Deep Segmentation module 220. At steps 418 and 419 the sequence of images is processed to yield a processed source video (e.g. a processed sequence of character(s) source video(s)). Specifically, in accordance with embodiments, and as illustrated in FIG. 5, the processing includes editing the sequence of character(s) in the source video(s) based on one or more parameters of the media recording. For example, at step 418 the editing step comprise resizing the sequence of image frames based on the media recording parameters. In some embodiments, the resizing comprises changing the size of a graphic picture by adding or removing pixels according to received face markers of the media recording as illustrated in detail with respect to the resize module 230 and face detection module 235 of FIG. 2F and as will be illustrated herein below with respect to steps 427 and 428. At step 419 the editing includes cropping or padding each image of the sequence of images (of the media asset source) for example with alpha=0 pixels Specifically, the editing process includes first resizing the image to reach the closest resolution to the second image, then padding/cropping the resized image to reach the second photo aspect ratio.

A detailed explanation of the resizing and padding process is illustrated in FIG. 7, in accordance with embodiments. There are provided two images, image 2 may relate to video 2 such as popular video (e.g. source media recording) and image 1 may relate to video 1 such a user media recording (e.g. client video). In accordance with embodiments, image 2 is resized to reach image 1 resolution while keeping image 2 original aspect ratio: X1=cX2 OR Y1=cY2.

The following step includes padding or cropping image 2 to reach image 1 aspect ratio, as follows:
For padding: X1=cX2 Y2=cY2+2d
For cropping: cX2−2d At step 420 a user may record a media recording 404 or receive his media recording via the network. In some cases, the media recording may be received for example via the network or from the user device. In some cases, the media recordings may comprise user video and user audio data. In some cases, the media recording is recorded using his device, such as device 34, for example, while playing one of the selected media asset sources. In some cases, once the user selects a media asset source and once he completes recording his video the selected media asset source and his recording are automatically or autonomously mixed together, for example, in real-time or close to real-time.

In some cases, the media recording comprises a plurality of video frames (e.g. client video frames).

At step 421 one or more parameters are retrieved from the media recording 404. Then at step 422 the retrieved parameters of the media asset source 402 and retrieved parameters of the media recording 404 are compared to one another. This step is needed to make sure that for example the resolution, frame rate and bit rate are matching In cases where the media recording parameters don't match the media asset video parameters then at step 423 the media recording is transcoded according to the source media asset parameters. Transcoding includes a process of video processing in which the video is reformatted from one format/codec (internal structure) into a new format/codec. Thereafter, once the parameters match, at step 424 the media recording 404 is parsed to a plurality of user video frames, while if the media recording parameters already match the media asset parameters then directly at step 424 the media recording is parsed to a plurality of client video frames.

At step 427 one frame such as the first frame of the media recording is selected and at step 428 one or more characters are identified. For example, one or more detected character face markers (e.g. user face markers) are obtained using for example face detection or face recognition methods. The obtained face markers are further used at step 418 to edit the sequence of elements such as character(s) in the source video(s) based on the face markers (e.g. decode the character media source image into a sequence of image frames and convert it to a graphical format such as resize to a PNG sequence format). At step 430 the one or more detected characters or objects in the media recording such in the first frame of the media recording are removed from the media recording to yield frames comprising shadows of the removed characters and frames background.

At step 432 the remained background (i.e. the shadows of the removed characters which still remained following the removal of the one or more character's) is completed using neural network methods to yield a new and full background image or a plurality of images comprising a full background (which doesn't include the deleted characters). Examples of neural network methods which may be used for Image completion in accordance with embodiments may include one or more of: deep convolutional generative adversarial nets (DCGAN), or Deep fusion network for image completion (DFNet), PathMatch algorithm, GLCIC from pytourch, and the like. The remaining background is completed in accordance with embodiments to match the original background surrounding the removed background. At step 434 the new and full background image(s) is/are manipulated (e.g. flipped) using three dimensional (3D) or two dimension 2D object manipulation techniques. The manipulation comprises, in accordance with embodiments, flipping the new and full background image(s) for example in 180 deg around a Y axis with respect to an X-Y-Z Cartesian axis. At the following steps (e.g. steps 436 and 438) the new and full background image(s), the processed media asset and the media recording are stitched together (e.g. mixed together) to yield a mixed media asset (super duet mixing). Specifically, at step 436 the full background image is used as a background image for the processed media asset source (e.g. which includes the popular character) and accordingly the processed source video is superposed on the new manipulated (e.g. flipped) background to yield the mixed media asset. At step 438 the new media asset source and the processed user recording video are stitched together forming a mixed media asset (e.g. super duet mixed video) which includes the new formed and complete background used as the background for the popular character (as originally was included in the media source) and the character(s) of the media recording (e.g. the user in case of a selfie video). In some cases, at step 440 a color effect is added to the mixed video to get the original aspect ratio, for example, one or more stripes on each side (or top-bottom) of the image are added. The strips may be colored, or include a blur effect for the last pixel line of the image which is closest to the lines.

In accordance with embodiments, the new processed full background as formed at steps 426-432 is used for all the popular video frames (e.g. source video frames). Advantageously, the method of using only the formed background based on the first frame of the media recording for all media asset frames require less processing time, however, the resulted mixing may be sometimes inaccurate and not natural in cases, for example, where the user recording background includes non-static elements such as moving elements, e.g. vehicles or any object which changes his initial location from frame to frame.

Figure 4B:
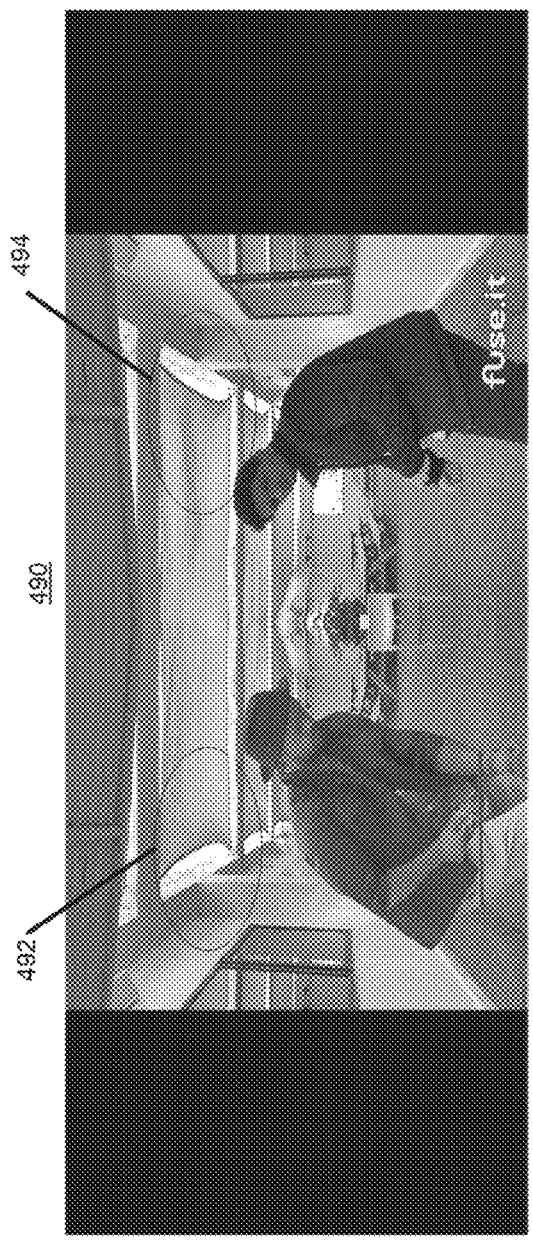
FIG. 4B and FIG. 4C show examples of a mixed media, in accordance with embodiments.
Figure 4C:

For example, as illustrated in FIG. 4B, the popular character's (Justin Timberlake) circled background 492 in the left of frame 490 which is based on the user's recording first frame is static and would not change in the following frames such as frame 491 and related background 492' shown in FIG. 4C, while the user's circled background 494 in the right changes from frame to frame. Specifically, as can be seen in FIG. 4B and FIG. 4C the circled shade canopy above the user (in the right side of the frame) swings from frame to frame (see circled background 494 vs. circled background 494') while the related hade above Justin at the left side is static, resulting in video frames where the left side and the right side of some frames are asynchronous. Therefore, method 400 as illustrated in FIG. 4A may be preferably used for media recordings and/or media assets which include static elements, while for cases including moving elements the following method 495 as illustrated in FIG. 4D may be utilized in accordance with embodiments.

FIG. 4D presents method 495 which comprises all the steps of FIG. 4A except for block 427 which instead of step 427 comprises step 426. At step 426 for each frame of the media recording (and not just the first frame as performed in FIG. 4A) operating steps 430 and 432 comprise removing one or more characters from each video frame and completing the background using neural network AI to yield a full and new image background for each frame and further at step 437 using the processed new and full background of each frame of the user recording for the corresponding frame of the popular video (e.g. source media). Advantageously, as the background of the user recording is used for the corresponding frame on the source media the mixed media looks more realistic as the background is not static and changes frame by frame, e.g. the background of frame number 1 of the user recording is used as a background for the corresponding frame number 1 of the media source (e.g. popular) and the background of frame number 2 of the user recording is used as a background for the corresponding frame number 2 of the media source, and so on for all frames.

FIG. 5 shows corresponding visual image examples 510, 514, 515, 516, 518 and 519 of related processing steps 510', 514', 515', 516', 518' and 519', in accordance with embodiments. The processing steps 513'-519' are related to steps 412-419 of FIG. 4A which include image background removal, generating a sequence of images, and accordingly editing the image (e.g. resizing and/or cropping the images).

In accordance with some embodiments, processing steps 513'-519' may be performed in an offline mode.

In accordance with embodiments, processing steps 513'-519' may be performed using the modules of FIG. 2F.

In accordance with embodiments, at step 510 the user selects a media asset source illustrated as a popular video 502 including a character such as famous character 513. The next processing steps include at step 514' detecting one or more characters in the selected media source such as the famous character 513 and at step 515' removing background 523 surrounding the character 513 to yield processed image 517 which includes only in the image of the famous character 513. Then at step 516' a sequence of images such as PNG sequence of images 519 is decoded from the processed image 517. Images 519 include only the frames' characters (e.g. the popular character 513). At the following step 518' each image of the sequence of images 519 may be edited for example resized to a sequence of images 521. In some embodiments, the sequence of images 521 may be edited (e.g. resized) according to received face markers as explained in detail with respect to FIG. 2, FIG. 4A and FIG. 7. At the following step 519' the edited images 521 are cropped to yield images 523.

FIG. 7 shows visual processing steps 420-440 of FIG. 4 and related modules of FIG. 2H, in accordance with embodiments. According to some embodiments, steps 420-440 may be performed in an online mode.

It is stressed that the specification and figures according to embodiments may be implemented in various ways, for example the source video may be selected as the background and not the client video background. Additionally, various embodiments may be provided in a processing and mixing step to provide different mixing or super mixing videos. In further embodiments, the processing unit may be a digital processing device including one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

In some embodiments, the system disclosed herein includes one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media. In some embodiments, the system disclosed herein includes at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Swift, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

In some embodiments, the system disclosed herein includes software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

In some embodiments, the system disclosed herein includes one or more databases, or use of the same. In view of the disclosure provided herein, those of skill in the art will recognize that many databases are suitable for storage and retrieval of information as described herein. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included. Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described. Methods of the present invention may be implemented by performing or completing manually, automatically, or a combination thereof, selected steps or tasks.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined. The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for media processing, comprising:
    providing at least one media asset source selected from a media asset sources library, the at least one media asset source comprising at least one source video, via a network to a client device;
    receiving via the network or the client device a media recording comprising a client video recorded by a user of the client device;
    transcoding the at least one source video and the client video, wherein said transcoding comprises:
        matching parameters of the client video to the parameters of the at least one source video or vice versa;
        parsing the client video and the source video, respectively, to a plurality of client video frames and a plurality of source video frames based on the matching;
    segmenting one or more frames of the plurality of source video frames to one or more character frames;
    detecting one or more face images in one or more frames of the plurality of client video frames and provide face markers;
    resizing the one or more character frames according to the face markers;
    compositing the resized character frames with the background frames using one or more blending methods to yield mixed media asset frames; and
    encoding the mixed media asset frames to yield a mixed media asset video.

2. The method of claim 1, further comprising:
    identifying one or more surfaces or areas in the at least one source video or the client video; and
    placing the one or more character frames on the identified surfaces or areas.

3. The method of claim 2, further comprising:
    segmenting the one or more frames of the plurality of client video frames to one or more background frames;
    completing a silhouette formed in the one or more background frames using neural network methods to yield at least one full background frame;
    manipulating the full background frame around a Y axis with respect to an X-Y-Z Cartesian axis;
    compositing the resized character frames with the manipulated background frames using the one or more blending methods to yield one or more composed frames;
    stitching the composed frames with the client video frames to yield super mixed media asset frames.

4. The method of claim 3, wherein said completing background process comprises pixel prediction using a neural network or machine learning techniques.

5. The method of claim 3, wherein the manipulating comprises flipping the full background image in 180 deg around a Y axis with respect to an X-Y-Z Cartesian axis.

6. The method of claim 1, wherein the segmentation process comprises removing the background from the source video frames.

7. The method of claim 1, wherein the compositing process comprises alpha blending the resized character frames with the background frames.

8. The method of claim 1 comprising:
cropping or padding the plurality of client video frames to reach the ratio of the source frames.

9. The method of claim 1 comprising:
recording the client video while playing the source video.

10. The method of claim 1, wherein the frame rate or bit rate of the at least one source video is different from the frame rate and or bit rate of the client video.

11. The method of claim 1, wherein said parameters are one or more of:
frame rate, bit rate and resolution.

12. The method according to claim 1, wherein the at least one source video comprises a source audio track and the client video comprises a client audio track and wherein the method further comprising mixing the source audio track and the client audio track.

13. An apparatus for media processing, compressing:
a memory which is configured to hold one or more source media asset; and
a processor which is configured to:
transmit the one or more source media videos to a client device;
receive via the network or the client device a media recording comprising a client video recorded by a user of the client device;
transcode the at least one source video and the client video, wherein said transcoding comprises:
matching parameters of the client video to the at least one source video or vice versa;
parsing the client video and the source video, respectively, to a plurality of client video frames and a plurality of source video frames based on the matching;
segment one or more frames of the plurality of source video frames to one or more character frames;
detect one or more face images in one or more frames of the plurality of client video frames and provide face markers;
resize the one or more character frames according to the face markers;
composite the resized character frames with the background frames using one or more blending methods to yield mixed media asset frames; and
encode the mixed media asset frames to yield a mixed media asset video.

14. The apparatus of claim 13, further comprising a detector configured and enabled to:
identify one or more surfaces or areas in the at least one source video or the client video; and
place the one or more character frames on the identified surfaces or areas.

15. The apparatus of claim 14, wherein the processor is further configured to:
segment the one or more frames of the plurality of client video frames to one or more background frames;
complete a silhouette formed in the one or more background frames using neural network methods to yield at least one full background frame;
manipulate the full background frame around a Y axis with respect to an X-Y-Z Cartesian axis;
composite the resized character frames with the manipulated frames using the one or more blending methods to yield composed frames; and
stitch the composed frames with the client video frames to yield super mixed media asset frames.

16. The apparatus of claim 14, wherein the neural network methods are selected from the group consisting of:
deep convolutional generative adversarial nets (DC-GAN), Deep fusion network for image completion (DFNet), PathMatch algorithm, GLCIC from pytourch.

17. The apparatus of claim 13, wherein the at least one source video comprises a source audio track and the client video comprises a client audio track and wherein the processor is further configured to mix the source audio track and the client audio track.

18. A computer software product, comprising a non-transitory computer-readable medium in which program instructions are stored, which instructions, when read by a computer, cause the computer to provide at least one media asset source selected from a media asset sources library, the at least one media asset source comprising at least one source video, via a network to a client device;
receive via the network from the client device a media recording comprising a client video recorded by a user of the client device;
transcode the at least one source video and the client video, wherein said transcoding comprises:
matching parameters of the client video to the at least one source video or vice versa;
parsing the client video and the source video, respectively, to a plurality of client video frames and a plurality of source video frames based on the matching;
segment one or more frames of the plurality of source video frames to one or more character frames;
detect one or more face images in one or more frames of the plurality of client video frames and provide face markers;
resize the one or more character frames according to the face markers;
composite the resized character frames with the background frames using one or more blending methods to yield a mixed media asset frames; and
encode the mixed media asset frames to yield a mixed media asset video.

* * * * *